(12) United States Patent
Matsuura et al.

(10) Patent No.: US 6,381,620 B1
(45) Date of Patent: Apr. 30, 2002

(54) RICH TEXT MEDIUM DISPLAYING METHOD AND PICTURE INFORMATION PROVIDING SYSTEM USING CALCULATED AVERAGE REFORMATTING TIME FOR MULTIMEDIA OBJECTS

(75) Inventors: Shun Matsuura; Hitoshi Kato, both of Tokyo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/208,410

(22) Filed: Dec. 10, 1998

(30) Foreign Application Priority Data

Dec. 10, 1997 (JP) ............................................. 9-356365

(51) Int. Cl.[7] .......................... G06F 3/00; G06F 12/00; G06F 13/00; G06F 17/30
(52) U.S. Cl. ..................................... 707/500.1; 709/231
(58) Field of Search ....................... 707/500.1; 709/231, 709/234

(56) References Cited

U.S. PATENT DOCUMENTS

| | | | |
|---|---|---|---|
| 5,592,626 A | | 1/1997 | Papadimitriou et al. . 707/500.1 |
| 5,696,948 A | * | 12/1997 | Cruz et al. .................. 702/200 |
| 5,724,605 A | * | 3/1998 | Wissner ..................... 707/500.1 |
| 5,748,187 A | * | 5/1998 | Kim et al. ................. 707/500.1 |
| 6,085,221 A | * | 7/2000 | Graf ............................ 709/231 |
| 6,134,585 A | * | 10/2000 | Yamoto ........................ 725/93 |

FOREIGN PATENT DOCUMENTS

| | | | | |
|---|---|---|---|---|
| EP | 0702491 | 3/1996 | .......... | H04N/7/173 |
| JP | 6-214689 | 8/1994 | ............. | G06F/3/00 |
| WO | WO 9602876 | 2/1996 | ............. | G06F/1/04 |

OTHER PUBLICATIONS

Yu, J., et al., "Hypermedia Presentation and Authoring System," Computer Networks and ISDN Systems, vol. 29 No. 8–13, pp. 875–886, Sep. 1997.*

Abdel–Mottaleb, M., et al., "Aspects of Multimedia Retrieval," Philips Journal of Research, vol. 50 No. 1–2, pp. 227–251, Dec. 1996.*

* cited by examiner

Primary Examiner—Kevin J. Teska
Assistant Examiner—Jeffrey Allen Rossi
(74) Attorney, Agent, or Firm—Lowe Hauptman Gilman & Berner, LLP

(57) ABSTRACT

A plurality of object expanding time-lengths, respectively required to expand an object of each rich text medium, are stored in a server for each output format. When a request indicating a particular multimedia title is sent from a reproducing terminal to the server with a particular output format, particular object expanding time-lengths of each particular rich text medium of the particular multimedia title corresponding to the particular output format are read out. In cases where any particular object expanding time-length is not stored in the server, the particular object expanding time-lengths are measured in the server. Thereafter, a medium expanding time-length required to expand one particular rich text medium is calculated from the particular object expanding time-lengths of each particular rich text medium, a scenario indicating a display time of each particular rich text medium and the medium expanding time-lengths are sent to the reproducing terminal. The reproducing terminal sends an expanding request to the server at a specific time earlier than the display time of each particular rich text medium by its medium expanding time-length, so that each particular rich text medium is expanded to a display image in the server, and each display image is displayed at its display time in the reproducing terminal.

31 Claims, 19 Drawing Sheets

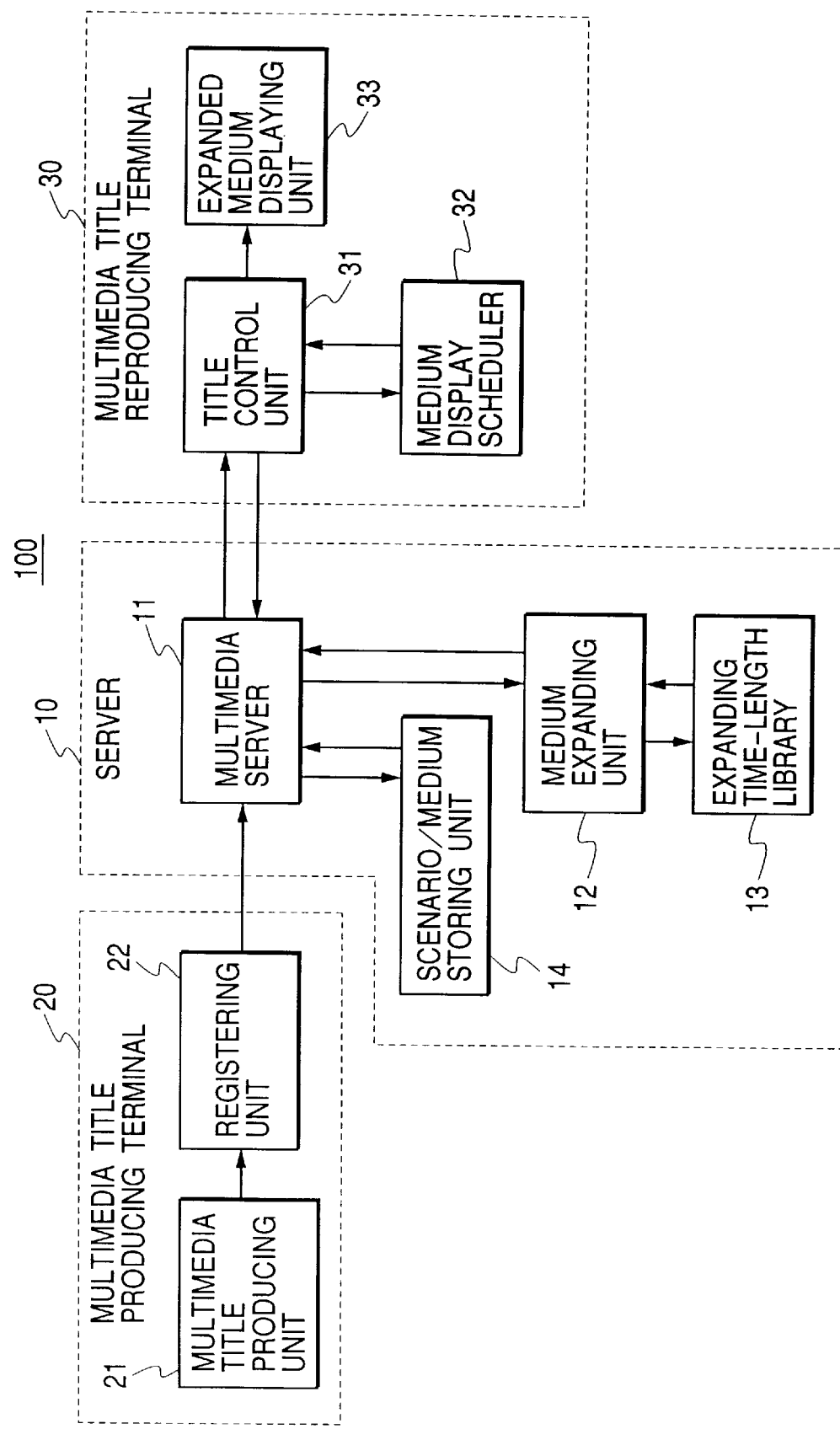

| MEDIUM ID | RICH TEXT MEDIA | MEDIUM DECODER ID |
|---|---|---|
| #1 | RICH TEXT MEDIUM 1 | @1 |
| #2 | RICH TEXT MEDIUM 2 | @2 |
| #3 | RICH TEXT MEDIUM 3 | @3 |
| ⋮ | ⋮ | ⋮ |

| SCENARIO ELEMENT ID | SCENARIO ELEMENT |
|---|---|
| SE 1 | SCENARIO ELEMENT 1 |
| SE 2 | SCENARIO ELEMENT 2 |
| SE 3 | SCENARIO ELEMENT 3 |
| ⋮ | ⋮ |

DISPLAY IMAGE

OBJECTS

Ob1: FONT A  CHARACTER STRING C1
Ob2: FONT B  CHARACTER STRING C2
Ob3: PICTURE A
Ob4: PICTURE B
Ob5: FONT C  CHARACTER STRING C3
      TRANSPARENCY
Ob6: FONT D  CHARACTER STRING C4
Ob7: CURVED LINE IMAGE A
Ob8: FONT A  CHARACTER STRING C5
Ob9: FONT B  CHARACTER STRING C6
      TRANSPARENCY

TO FIG. 6(e)

DEPENDENCE RELATION SHIP

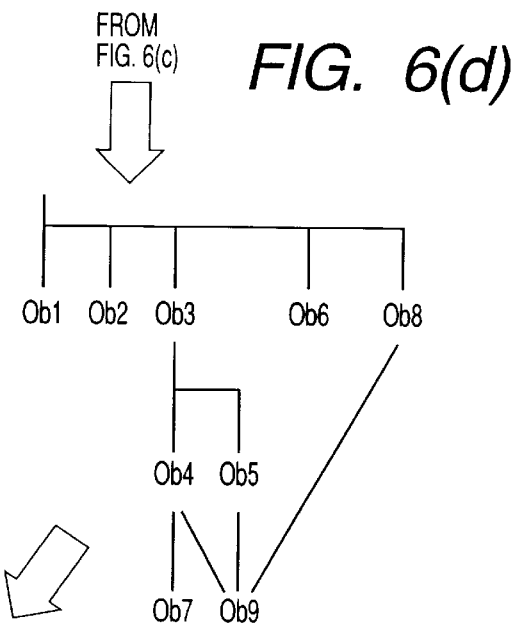
FIG. 6(d)
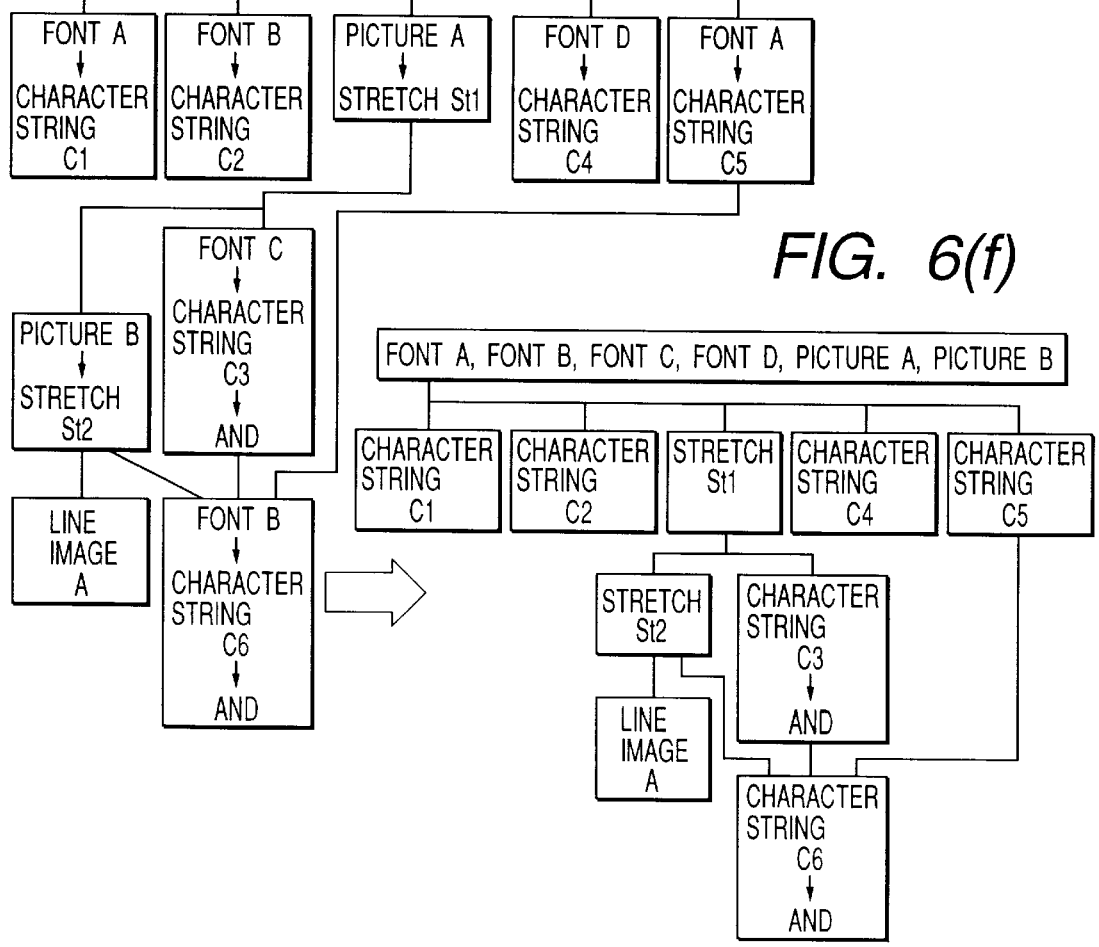
FIG. 6(e)
FIG. 6(f)

FIG. 7A

LIST OF IMAGE-DRAWING OPERATIONS

| OPERATION ID | IMAGE-DRAWING OPERATION |
|---|---|
| $1 | OPERATION 1 |
| $2 | OPERATION 2 |
| $3 | OPERATION 3 |
| $4 | OPERATION 4 |
| ⋮ | ⋮ |

FIG. 7B

LIST OF MEDIUM DECODERS

| DECODER ID | MEDIUM DECODER |
|---|---|
| @1 | TXT |
| @2 | RTF |
| @3 | PPT |
| @4 | XLS |
| ⋮ | ⋮ |

FIG. 7C

LIST OF OBJECT EXPANDING TIME-LENGTHS

| | ID | OBJECT EXPANDING TIME-LENGTHS | | | |
|---|---|---|---|---|---|
| | | FORMAT-1 | FORMAT-2 | FORMAT-3 | FORMAT-4 |
| IMAGE-DRAWING OPERATIONS | $1 | t1 | t2 | t3 | t4 |
| | $2 | t5 | | t6 | |
| | $3 | t7 | | | |
| | $4 | t8 | | | t9 |
| | ⋮ | ⋮ | ⋮ | ⋮ | ⋮ |
| RICH TEXT MEDIA | #1 | t11 | t12 | t13 | t14 |
| | #2 | t15 | t16 | | |
| | #3 | t17 | | t18 | |
| | #4 | t19 | | | t20 |
| | ⋮ | ⋮ | ⋮ | ⋮ | ⋮ |

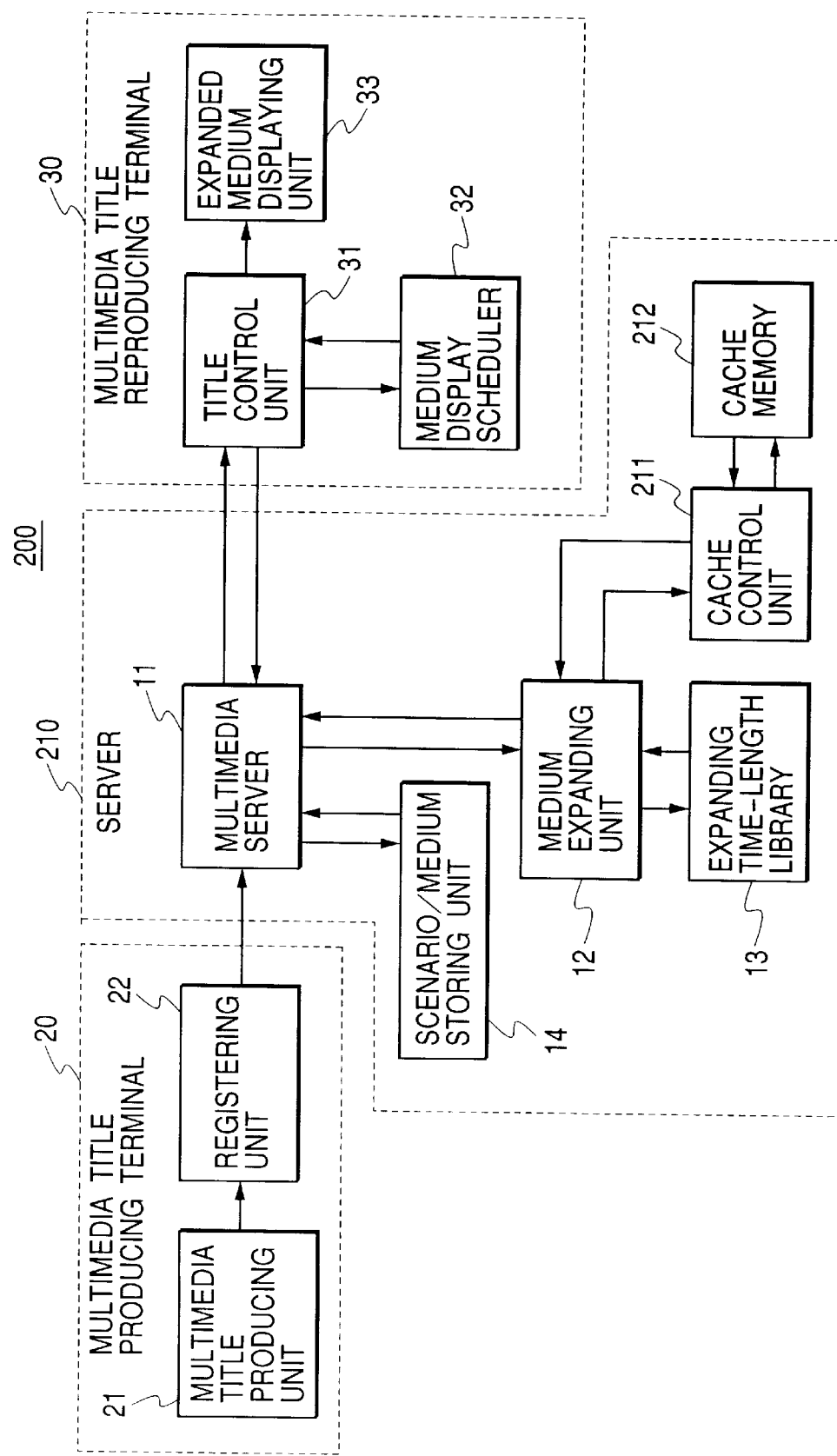

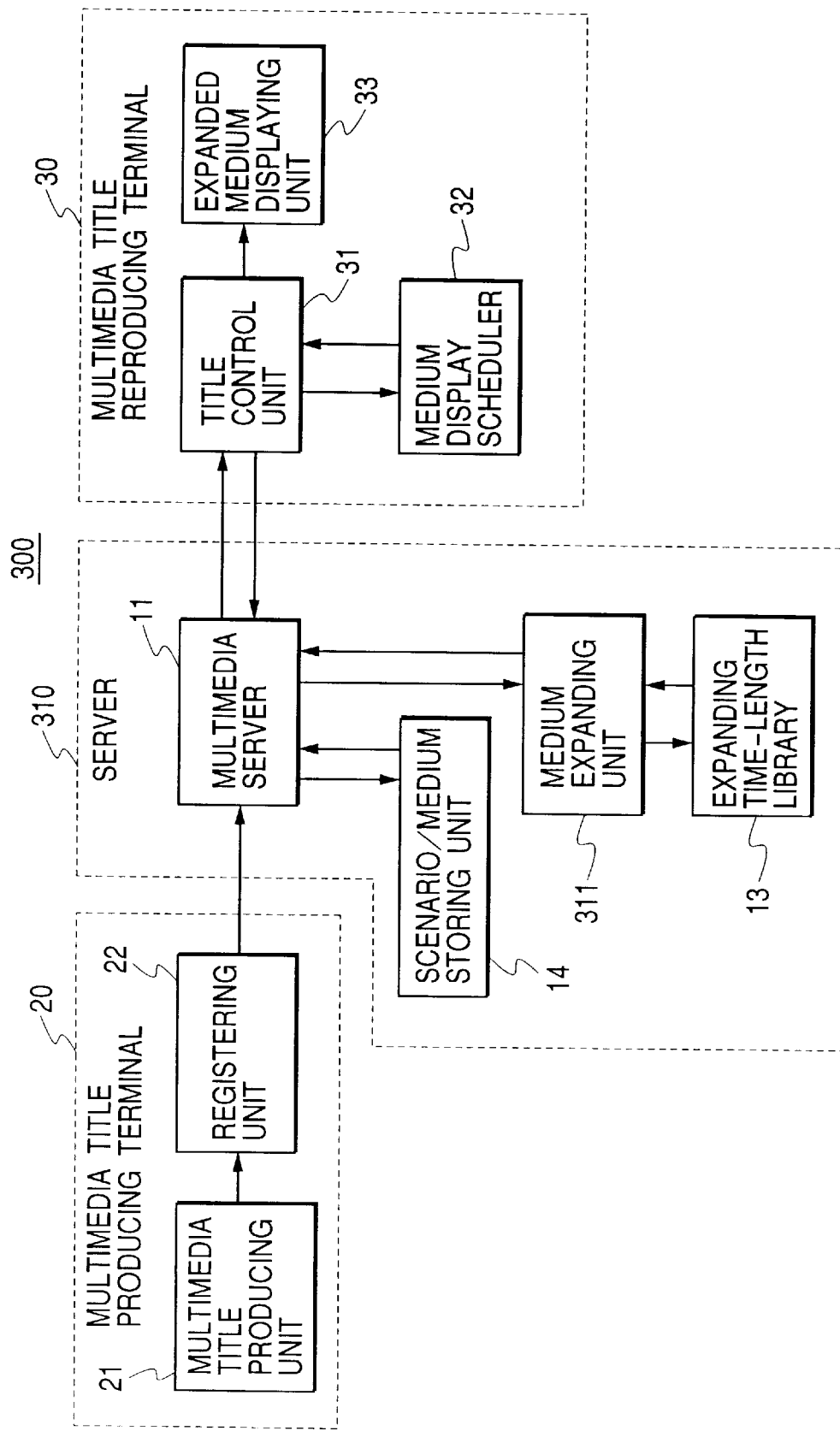

FIG. 12(c)
Ob1
Ob2 → Ob1
Ob3 → Ob1
Ob4
Ob5 → Ob1, Ob2
Ob6
Ob7 → Ob1, Ob3, Ob6
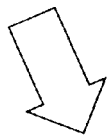
FIG. 12(d)
Ob1
Ob3
Ob4 → Ob8
Ob7 → Ob3, Ob8
Ob8
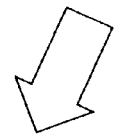
FIG. 12(e)
Ob1
Ob2 → Ob1
Ob3 → Ob1
Ob4 → Ob8
Ob5 → Ob1, Ob2
Ob6
Ob7 → Ob1, Ob3, Ob6, Ob8
Ob8

FIG. 17

LIST OF OBJECT EXPANDING TIME-LENGTHS

| ID | OBJECT EXPANDING TIME-LENGTHS ||||| |
| --- | --- | --- | --- | --- | --- |
|  | FORMAT-1 | FORMAT-2 | FORMAT-3 | FORMAT-4 | FORMAT-5 |
| $1 | t1 | t2 | t3 | t4 |  |
| $2 | t5 |  | t6 |  |  |
| $3 | t7 |  |  |  |  |
| $4 | t8 |  |  | t9 |  |
| ... | ... | ... | ... | ... |  |
| #1 | t11 | t12 | t13 | t14 |  |
| #2 | t15 | t16 |  |  |  |
| #3 | t17 |  | t18 |  |  |
| #4 | t19 |  |  | t20 |  |
| ... | ... | ... | ... | ... |  |

$1–$4: IMAGE-DRAWING OPERATIONS
1–#4: RICH TEXT MEDIA

RICH TEXT MEDIUM DISPLAYING METHOD AND PICTURE INFORMATION PROVIDING SYSTEM USING CALCULATED AVERAGE REFORMATTING TIME FOR MULTIMEDIA OBJECTS

BACKGROUND OF THE INVENTION

1. Field of the Invention

The present invention relates to a rich text medium displaying method for displaying an image of each rich text medium of a multimedia title at a display time of the rich text medium specified in a scenario of the multimedia title to reproduce the multimedia title, and relates to a picture information providing system, in which a server provides a title reproducing terminal each rich text medium of the multimedia title as picture information to display an image of the rich text medium at a display time of the rich text medium.

2. Description of the Related Art

A multimedia title is formed of various media (or materials) such as one or more moving pictures, one or more still pictures, one or more rich texts, one or more sounds and the like, and a displaying time of each medium of the multimedia title is specified in a scenario.

The rich text denotes a document in which characters, figures and ruled lines expressed by various colors and various fonts are drawn, and the rich text means a text having a rich expression power. For example, when a text in which characters of many sizes are included is made by using a word processor, the writing is classified into the rich text. In contrast, a text in which characters of a single font are included is called a plain text.

2.1. Previously Proposed Art

A device for outputting multimedia data (or a multimedia title) to a reproducing device at a specified time is disclosed in Published Unexamined Japanese Patent Application No. 6-214689 (1994), and an explanatory view showing an output of multimedia data in the device is shown in FIG. 1 as a first conventional example of a picture information providing system and a composing medium displaying method.

As shown in FIG. 1, an application program 1 of a computer system and a data outputting device 2 for outputting multimedia data to a reproducing device are provided, and the data outputting device 2 is composed of a data buffer 3 for temporarily storing multimedia data, an internal clock 4, a register 6 for setting an output time, a comparator 5 for comparing the output time of the register 6 and a time of the internal clock 4, and a valve 7 for outputting the multimedia data of the data buffer 3 to the reproducing device according to a detecting result of the comparator 5.

In the above configuration, after a reproducing time of the multimedia data is set in the register 6, the multimedia data is transmitted from the application program 1 to the data buffer 3. The multimedia data stored in the data buffer 3 is not output to the reproducing device during a closing time period of the valve 7. In the comparator 5, the output time of the register 6 is always compared with a current time of the internal clock 4. When current time of the internal clock 4 reaches the output time of the register 6, the valve 7 is opened, and the multimedia data stored in the data buffer 3 is output to the reproducing device to display the multimedia data.

Therefore, the multimedia data can be output from the data outputting device to the reproducing device at a time specified in a scenario.

Next, a second conventional example of a picture information providing system and a composing medium displaying method is described.

The inventors of this specification have developed a picture information providing system in which a multimedia title stored in a server is provided for a reproducing terminal. This system is shown in FIG. 2.

When a user desires to watch a multimedia title at a particular output format, a request of the multimedia title is sent with the particular output format from a reproducing terminal 9 to a server 8, a scenario of the multimedia title is sent from the server 8 to the reproducing terminal 9, so that a reproducing operation of the multimedia title is started in the reproducing terminal 9. Thereafter, to display composing media of the multimedia title at the particular output format at a display time specified in the scenario, the reproducing terminal 9 requests of the server 8 that the server 8 sends each composing medium of the multimedia title to the reproducing terminal 9 at a specific time determined according to the display time of the composing medium. Thereafter, in the server 8, each composing medium included in the multimedia title is converted into a display image according to the particular output format, and data of the display image is sent from the server 8 to the reproducing terminal 9. Therefore, the display image of each composing medium converted at the particular output format is displayed in the reproducing terminal 9 at the display time of the composing medium. The particular output format specifies a resolution degree, a display color, a display size and the like for the display image.

In general, assuming that the conversion of each composing medium into a display image at an output format is performed in a reproducing terminal, a data processing time-length (or a data expanding time-length) required to convert each composing medium into the display image depends on the performance of terminal resources (a central processing unit, a memory, an data expanding accelerator and the like) in which the data conversion is performed. To reduce the processing performed in the reproducing terminal 9 and to shorten the data expanding time-length in the picture information providing system shown in FIG. 2, it is required that the conversion of each composing medium into the display image is performed in the server 8 having a high processing performance.

Also, assuming that all composing media of the multimedia title are expanded in advance to a plurality of display images in the server 8 according to an output format specified in each reproducing terminal and assuming that the display images are stored in the server 8, a large capacity of memory is required of the server 8, so that the data expanding operation cannot be efficiently performed in the server 8. To efficiently perform the data expanding operation in the server 8, when the reproducing terminal 9 requests of the server 8 that the server 8 sends each composing medium of the multimedia title to the reproducing terminal 9 at the specific time, the composing medium is expanded to a display image according to the particular output format in the server 8, and data of the display image is sent from the server 8 to the reproducing terminal 9. Therefore, any large capacity of memory is not required of the server 8.

2.2. Problems to be Solved by the Invention

However, because an expanding time-length is required to convert each composing medium of the multimedia title into a display image, unless the reproducing terminal 9 requests the composing medium of the server 8 while considering the expanding time-length of the composing medium, the display image of the composing medium cannot be correctly displayed in the reproducing terminal 9 at the display time specified in the scenario. Therefore, it is important that each composing medium expanded according to a particular output format is correctly displayed in the reproducing terminal 9 at the display time specified in the scenario. Also, it is important that the expanding time-length for each composing medium is shortened.

SUMMARY OF THE INVENTION

A first object of the present invention is to provide, with due consideration to the drawbacks of such a conventional picture information providing system and a conventional composing medium displaying method, a picture information providing system and a rich text medium displaying method in which each rich text medium (corresponding to each composing medium in the prior art) of a multimedia title is expanded to a display image at a particular output format and is correctly displayed at its display time as picture information.

A second object of the present invention is to provide a picture information providing system and a rich text medium displaying method in which an expanding time-length required to convert each rich text medium of a multimedia title to a display image is shortened.

The first object is achieved by the provision of a rich text medium displaying method, comprising the steps of:

calculating a medium expanding time-length required to expand each particular rich text medium of a particular multimedia title to a display image suitable to a particular output format of a title reproducing terminal in a server;

sending a scenario specifying a display time of each particular rich text medium and the medium expanding time-lengths of the particular rich text media from the server to the title reproducing terminal;

recognizing the display time of each particular rich text medium according to the scenario in the title reproducing terminal;

sending a medium expanding request, which indicates to expand one particular rich text medium to a display image and to send the display image of the particular rich text medium to the title reproducing terminal at the display time of the particular rich text medium, to the server at a specific time earlier than the display time of each particular rich text medium by the medium expanding time-length of the particular rich text medium;

converting one particular rich text medium to a display image suitable to the particular output format of the title reproducing terminal in the server each time the medium expanding request is received;

sending the display image of each particular rich text medium from the server to the title reproducing terminal at the display time of the particular rich text medium; and displaying the display image of each particular rich text medium at the display time of the particular rich text medium to reproduce the particular multimedia title.

In the above steps, a medium expanding time-length corresponding to a particular output format of a title reproducing terminal is calculated in advance in a server for each particular rich text medium of a particular multimedia title. When the server receives an expanding time-length request from a reproducing terminal, a scenario and the medium expanding time-lengths of the particular rich text media are sent to the reproducing terminal. Therefore, the reproducing terminal can recognize a display time of each particular rich text medium and can send a medium expanding request indicating the expanding of each particular rich text medium to the server before the display time of -the particular rich text medium in anticipation of the medium expanding time-length of the particular rich text medium. That is, the reproducing terminal sends a medium expanding request to the server at a specific time earlier than the display time of each particular rich text medium by the medium expanding time-length of the particular rich text medium. When the server receives the medium expanding request for each particular rich text medium, the particular rich text medium is expanded to a display image suitable to the particular output format of the title reproducing terminal in the medium expanding time-length of the particular rich text medium, the display image of the particular rich text medium is sent to the title reproducing terminal at the display time of the particular rich text medium, and the display image of the particular rich text medium is displayed at the display time of the particular rich text medium. Therefore, the particular multimedia title is reproduced.

Accordingly, because the reproducing terminal can send a medium expanding request to the server before the display time of each particular rich text medium in anticipation of the medium expanding time-length of the particular rich text medium, each particular rich text medium of the particular multimedia title can be reproduced just at its display time.

It is preferred that the step of calculating a medium expanding time-length comprise the steps of:

decomposing each particular rich text medium into a plurality of objects;

measuring an object expanding time-length, required to expand one object of one particular rich text medium to a drawing image, for each object of the particular rich text media; and adding up the object expanding time-lengths of the objects of one particular rich text medium for each particular rich text medium to obtain the medium expanding time-lengths of the particular rich text media.

In the above steps, because the medium expanding time-length of each particular rich text medium is calculated by decomposing the particular rich text medium into a plurality of objects, the medium expanding time-length can be efficiently calculated.

It is also preferred that the step of measuring an object expanding time-length comprise the steps of:

dividing a plurality of operations required to convert the objects of each particular rich text medium into operations not depending on the particular output format of the title reproducing terminal and image-drawing operations depending on the particular output format of the title reproducing terminal;

preparing an image-drawing operation tree of the image-drawing operations depending on the particular output format of the title reproducing terminal for each particular rich text medium; and expanding each object of one particular rich text medium to a drawing image according to one image-drawing operation of one image-drawing operation tree for each particular rich text medium to detect the object expanding time-lengths of the objects of the particular rich text media.

In the above steps, because a plurality of image-drawing operations arranged in an image-drawing operation tree are prepared for each particular rich text medium, the medium expanding time-length can be efficiently calculated by performing the image-drawing operations one after another.

It is also preferred that the step of calculating a medium expanding time-length comprise the steps of:

storing an object expanding time-length, required to expand an object of one particular rich text medium to a drawing image suitable to each of a plurality of output formats, for each object of the particular rich text media;

selecting a plurality of particular object expanding time-lengths of the objects of the particular rich text media corresponding to the particular output format of the title reproducing terminal from the stored object expanding time-lengths corresponding to the output formats; and adding up the particular object expanding time-lengths of the objects of one particular rich text medium for each particular rich text medium to obtain the medium expanding time-lengths of the particular rich text media.

In the above steps, because object expanding time-lengths of objects of the particular rich text media corresponding to each of a plurality of output formats was calculated in the past and are stored, the medium expanding time-length of each particular rich text medium can be efficiently calculated by using the object expanding time-lengths of the particular rich text medium.

It is also preferred that the step of calculating a medium expanding time-length comprise the steps of:

storing an object expanding time-length, required to expand an object of one particular rich text medium to a drawing image suitable to each of a plurality of output formats, in a storage medium for each object of the particular rich text media;

checking whether or not a plurality of particular object expanding time-lengths of the objects of each particular rich text medium corresponding to the particular output format of the title reproducing terminal are included in the stored object expanding time-lengths of the particular rich text medium corresponding to the output formats;

measuring a particular object expanding time-length of each object of one particular rich text medium corresponding to the particular output format of the title reproducing terminal in cases where the particular object expanding time-lengths of the objects of the particular rich text medium corresponding to the particular output format of the title reproducing terminal are not included in the stored object expanding time-lengths of the objects of the particular rich text media corresponding to the output formats;

adding up the particular object expanding time-lengths of the objects of the particular rich text medium to obtain the medium expanding time-length of the particular rich text medium; and storing the particular object expanding time-lengths of the objects of the particular rich text medium corresponding to the particular output format of the title reproducing terminal in the storage medium.

In the above steps, in cases where the particular object expanding time-lengths corresponding to the particular output format of the title reproducing terminal are not included in the object expanding time-lengths corresponding to each of a plurality of output formats stored in the storage medium, because the particular object expanding time-lengths corresponding to the particular output format of the title reproducing terminal are measured and stored in the storage medium, the efficiency for the calculation of the medium expanding time-length of each particular rich text medium can be gradually heightened as the object expanding time-lengths corresponding to one output format are stored in the storage medium.

It is also preferred that the step of calculating a medium expanding time-length comprise the steps of:

checking whether or not it is possible to decompose each particular rich text medium into a plurality of objects;

directly expanding one particular rich text medium to a display image in cases where it is impossible to decompose the particular rich text medium into a plurality of objects; and measuring a medium expanding time-length required to directly expand the particular rich text medium to the display image.

In the above steps, because one particular rich text medium is directly expanded to a display image even though it is impossible to decompose the particular rich text medium into a plurality of objects, a medium expanding time-length for any type of rich text medium can be calculated.

It is also preferred that the step of calculating a medium expanding time-length comprise the steps of:

checking whether or not it is possible to decompose each particular rich text medium into a plurality of objects;

storing a medium expanding time-length, required to expand one particular rich text medium to a display image according to each of a plurality of output formats in cases where it is impossible to decompose the particular rich text medium into a plurality of objects; and selecting a particular medium expanding time-length of the particular rich text medium corresponding to the particular output format of the title reproducing terminal from the stored medium expanding time-lengths corresponding to the output formats.

In the above steps, even though it is impossible to decompose a particular rich text medium into a plurality of objects, because a particular medium expanding time-length of the particular rich text medium is stored, the expanding of the particular rich text medium to a display image can be easily performed at its display time by using the stored particular medium expanding time-length.

It is also preferred that the step of calculating a medium expanding time-length comprise the steps of:

checking whether or not it is possible to decompose each particular rich text medium into a plurality of objects;

storing a medium expanding time-length, required to expand one particular rich text medium to a display image according to each of a plurality of output formats, in a storage medium in cases where it is impossible to decompose the particular rich text medium into a plurality of objects;

checking whether or not a particular medium expanding time-length of the particular rich text medium corresponding to the particular output format of the title reproducing terminal is included in the medium expanding time-lengths stored in the storage medium;

directly expanding the particular rich text medium to a display image in cases where a particular medium expanding time-length of the particular rich text medium corresponding to the particular output format of the title reproducing terminal is not included in the medium expanding time-lengths stored in the storage medium;

measuring a particular medium expanding time-length required to directly expand the particular rich text medium to the display image; and storing the particular medium expanding time-length of the particular rich text medium corresponding to the particular output format of the title reproducing terminal in the storage medium.

In the above steps, in cases where it is impossible to decompose a particular rich text medium into a plurality of objects and in cases where a particular medium expanding time-length of the particular rich text medium corresponding to the particular output format of the title reproducing terminal is not included in the medium expanding time-lengths corresponding to each of a plurality of output formats stored in the storage medium, because the medium object expanding time-length of the particular rich text medium corresponding to the particular output format of the title reproducing terminal is measured and stored in the storage medium, the efficiency for the detection of the medium expanding time-length of each particular rich text medium not decomposed can be gradually heightened as the medium expanding time-lengths corresponding to one output format are stored in the storage medium.

To achieve the second object, it is also preferred that the step of calculating a medium expanding time-length comprise the steps of:

decomposing each particular rich text medium into a plurality of objects;

expanding each object of one particular rich text medium to a drawing image suitable to the particular output format of the title reproducing terminal for each particular rich text medium;

selecting one or more specific drawing images of specific objects of a specific rich text medium from the drawing images of the particular rich text media;

storing the specific drawing images of the specific objects of the specific rich text medium in a storage medium;

measuring an object expanding time-length, required to expand one object of one particular rich text medium to a drawing image, for each object of the particular rich text media other than the specific objects of the specific rich text medium;

setting an object expanding time-length of each specific object to zero; and adding up the object expanding time-lengths of the objects of one particular rich text medium for each particular rich text medium to obtain the medium expanding time-lengths of the particular rich text media, and the step of converting one particular rich text medium comprises the steps of:

specifying the specific objects according to the specific drawing images stored in the storage medium;

expanding each of the objects other than the specific objects to a drawing image according to one image-drawing operation;

combining the drawing images of the objects of one particular rich text medium into a display image of the particular rich text medium for each particular rich text medium other than the specific rich text medium; and combining the drawing images of the objects of the specific rich text medium into a display image of the specific rich text medium while using the specific drawing images of the specific objects stored in the storage medium.

In the above steps, because one or more specific drawing images of one or more specific objects of the specific rich text medium are stored in a storage medium, a time-length required for the combination of the drawing images of the objects of the specific rich text medium into a display image of the specific rich text medium can be shortened by using the specific drawing images of the specific objects stored in the storage medium.

It is preferred that the step of selecting one or more specific drawing images comprise the steps of:

detecting frequency in use of each drawing image; and setting one or more drawing images of high frequencies as the specific drawing images.

In the above steps, because one or more drawing images of high frequencies are set as the specific drawing images, a data volume of the specific drawing images stored in the storage medium can be suppressed.

To achieve the second object, it is also preferred that the step of calculating a medium expanding time-length comprise the steps of:

decomposing each particular rich text medium into a plurality of objects;

preparing an image-drawing operation tree of a plurality of image-drawing operations, required to convert the objects of one particular rich text medium into a plurality of drawing images according to the particular output format of the title reproducing terminal, for each particular rich text medium;

expanding each object of one particular rich text medium to a drawing image suitable to the particular output format of the title reproducing terminal according to one image-drawing operation of one image-drawing operation tree corresponding to the particular rich text medium for each particular rich text medium;

estimating an importance degree of each image-drawing operation of a specific image-drawing operation tree according to the arrangement of the image-drawing operations in the specific image-drawing operation tree;

detecting one or more specific image-drawing operations having high importance degrees from the image-drawing operations of the specific image-drawing operation tree;

specifying a specific drawing image obtained by expanding one specific object according to one specific image-drawing operation for each specific image-drawing operation;

storing the specific drawing images of the specific objects in a storage medium;

measuring an object expanding time-length, required to expand one object of one particular rich text medium to a drawing image, for each object of the particular rich text media other than the specific objects of a specific rich text medium;

setting an object expanding time-length of each specific object to zero; and adding up the object expanding time-lengths of the objects of one particular rich text medium for each particular rich text medium to obtain the medium expanding time-lengths of the particular rich text media, and the step of converting one particular rich text medium comprises the steps of:

specifying the specific objects according to the specific drawing images stored in the storage medium;

expanding each of the objects other than the specific objects to a drawing image according to one image-drawing operation;

combining the drawing images of the objects of one particular rich text medium into a display image of the particular rich text medium for each particular rich text medium other than the specific rich text medium; and combining the drawing images of the objects of the specific rich text medium into a display image of the specific rich text medium while using the specific drawing images of the specific objects stored in the storage medium.

In the above steps, because one or more specific drawing images having high importance degrees are selected from drawing images of objects of a specific rich text medium and are stored in a storage medium, a time-length required for the combination of the drawing images of the objects of the specific rich text medium into a display image of the specific rich text medium can be shortened by using the specific drawing images of the specific objects stored in the storage medium.

To achieve the second object, it is also preferred that the step of calculating a medium expanding time-length comprise the steps of:

detecting that the display times of a plurality of specific rich text media selected from the particular rich text media agree with each other;

decomposing each specific rich text medium into a plurality of objects;

preparing a specific image-drawing operation tree of a plurality of specific image-drawing operations, required to convert the objects of one specific rich text medium into a plurality of drawing images according to the particular output format of the title reproducing terminal, for each specific rich text medium;

preparing a combined image-drawing operation tree by combining the specific image-drawing operation trees while setting each specific image-drawing operation common to two or more specific image-drawing operation trees as one specific image-drawing operation in the combined image-drawing operation tree;

measuring an object expanding time-length of one object required to expand the object to a drawing image according to one specific image-drawing operation for each specific image-drawing operation of the combined image-drawing operation tree; and adding up the object expanding time-lengths of the specific image-drawing operations of the combined image-drawing operation tree to obtain a medium expanding time-length of the specific rich text media, and the step of converting one particular rich text medium comprises the step of:

converting the specific rich text media to a combined display image obtained by expanding objects of the specific rich text media according to the specific image-drawing operations of the combined image-drawing operation tree.

In the above steps, even though the display times of a plurality of specific rich text media agree with each other to simultaneously display a plurality of display images of the specific rich text media, because a combined image-drawing operation tree of specific image-drawing operations corresponding to a combined rich text medium obtained by combining the specific rich text media is prepared from a plurality of specific image-drawing operation trees corresponding to the specific rich text media while each specific image-drawing operation common to two or more specific image-drawing operation trees is set as one specific image-drawing operation in the combined image-drawing operation tree, each object common to two or more specific rich text media is set as one object in the combined rich text medium. Therefore, because a plurality of display images of the specific rich text media are not produced but a combined display image of the specific rich text media is produced, each specific image-drawing operation common to two or more specific image-drawing operation trees is performed only once, so that a time-length required to obtain the combined display image of the specific rich text media can be shortened.

To achieve the second object, it is also preferred that the step of calculating a medium expanding time-length comprise the steps of:

decomposing each specific rich text medium into a plurality of objects;

preparing an image-drawing operation tree of a plurality of image-drawing operations, required to convert the objects of one particular rich text medium into a plurality of drawing images according to the particular output format of the title reproducing terminal, for each particular rich text medium;

measuring an object expanding time-length of one object required to expand the object to a drawing image according to one image-drawing operation for each object of the particular rich text media;

dividing the image-drawing operations of each image-drawing operation tree into a first group of image-drawing operations corresponding to first objects of one particular rich text medium and a second group of image-drawing operations corresponding to second objects of the particular rich text medium on condition that the first group of image-drawing operations has no dependence relationship with the second group of image-drawing operations;

adding up the object expanding time-lengths of the first group of image-drawing operations of one image-drawing operation tree corresponding to one particular rich text medium to obtain a first medium expanding time-length of the particular rich text medium for each particular rich text medium; and adding up the object expanding time-lengths of the second group of image-drawing operations of one image-drawing operation tree corresponding to one particular rich text medium to obtain a second medium expanding time-length of the particular rich text medium for each particular rich text medium, the step of sending a scenario comprises the step of:

sending the second group of image-drawing operations of the image-drawing operation trees, the second objects of the particular rich text media, the second medium expanding time-lengths of the particular rich text media, the scenario and the first medium expanding time-lengths of the particular rich text media to the title reproducing terminal, the step of sending a medium expanding request comprises the step of:

sending a medium expanding request, which indicates to expand one particular rich text medium to a display image and to send the display image of the particular rich text medium to the title reproducing terminal at the display time of the particular rich text medium, to the server at a first specific time earlier than the display time of each particular rich text medium by the first medium expanding time-length of the particular rich text medium, the step of converting one particular rich text medium comprises the steps of:
    expanding the first objects of each particular rich text medium to a plurality of first drawing images suitable to the particular output format of the title reproducing terminal at the first specific time according to the first group of image-drawing operations of one image-drawing operation tree in the server;
    converting the first drawing images of each particular rich text medium to a first display image suitable to the particular output format of the title reproducing terminal by combining the first drawing images in the server;
    expanding the second objects of each particular rich text medium to a plurality of second drawing images suitable to the particular output format of the title reproducing terminal according to the second group of image-drawing operations of one image-drawing operation tree in the title reproducing terminal at a second specific time earlier than the display time of the particular rich text medium by the second medium expanding time-length of the particular rich text medium; and
    converting the second drawing images of each particular rich text medium to a second display image suitable to the particular output format of the title reproducing terminal by combining the second drawing images in the title reproducing terminal, and
the step of sending the display image comprises the steps of:
    sending the first display image of each particular rich text medium from the server to the title reproducing terminal at the display time of the particular rich text medium; and
    combining the first and second display images of each particular rich text medium to produce a combined display image for each particular rich text medium.

In the above steps, the image-drawing operations of each image-drawing operation tree are divided into a first group of image-drawing operations and a second group of image-drawing operations, first objects of each particular rich text medium are expanded to first drawing images according to the first group of image-drawing operations in the first medium expanding time-length in the server, and second objects of each particular rich text medium are expanded to second drawing images according to the second group of image-drawing operations in the second medium expanding time-length in the title reproducing terminal. Because a medium expanding time-length of all objects of each particular rich text medium is equal to the sum of the first and second medium expanding time-lengths, the first and second medium expanding time-lengths are shorter than the medium expanding time-length of all objects. Therefore, a time-length required to expand each particular rich text medium to a display image can be shortened.

To achieve the second object, it is also preferred that the step of calculating a medium expanding time-length comprise the steps of:
    calculating a medium expanding time-length required to expand each particular rich text medium of the particular multimedia title to a display image suitable to one output format for each of a plurality of output formats;
    storing the medium expanding time-lengths of the particular rich text media in a first storage medium for each of the output formats;
    checking whether or not the medium expanding time-lengths of the particular rich text media corresponding to the particular output format of the title reproducing terminal are stored in the first storage medium;
    decomposing each particular rich text medium into a plurality of objects in cases where any medium expanding time-length corresponding to the particular output format of the title reproducing terminal is not stored in the first storage medium;
    preparing an image-drawing operation tree of a plurality of image-drawing operations, required to convert the objects of one particular rich text medium into a plurality of drawing images according to the particular output format of the title reproducing terminal, for each particular rich text medium;
    expanding each object of one particular rich text medium to a drawing image suitable to the particular output format of the title reproducing terminal according to one image-drawing operation of one image-drawing operation tree corresponding to the particular rich text medium for each particular rich text medium;
    storing the drawing images of the objects of the particular rich text media corresponding to the particular output format of the title reproducing terminal in a second storage medium; and
    setting a medium expanding time-length, required to expand each particular rich text medium of the particular multimedia title to a display image suitable to the particular output format of the title reproducing terminal, to zero, and
the step of converting one particular rich text medium comprises the steps of:
    reading out the drawing images stored in the second storage medium; and
    combining the drawing images of the objects of one particular rich text medium into a display image of the particular rich text medium for each particular rich text medium.

In the above steps, in cases where each object of particular rich text media is expanded to a drawing image suitable to the particular output format of the title reproducing terminal because any medium expanding time-length of the particular rich text media corresponding to the particular output format of the title reproducing terminal is not stored in the first storage medium, the drawing images of the objects of the particular rich text media are stored in a second storage medium. Therefore, when display images of the particular rich text media are requested, a time-length required to produce the display images of the particular rich text media can be shortened by using the stored drawing images.

The first object is also achieved by the provision of a picture information providing system, comprising:
    a server for providing a particular multimedia title as picture information; and
    a title reproducing terminal for reproducing the particular multimedia title provided from the server,
the server comprising:
    picture information storing means for storing a plurality of particular rich text media of the particular multimedia title and a scenario specifying a display time of each particular rich text medium;
    medium expanding means for expanding each particular rich text medium stored in the picture information storing means to a display image suitable to an output format and calculating a medium expanding time-length, required to expand one particular rich text medium to one display image suitable to one output format, for each particular rich text medium;
    expanding time-length storing means for storing the medium expanding time-lengths of the particular rich text media calculated by the medium expanding means for each of a plurality of output formats; and server control means for controlling the medium expanding means to calculate a medium expanding time-length of one particular rich text medium corresponding to a particular output format for each particular rich text medium in advance or in response to an expanding time-length request sent from the title reproducing terminal, sending the scenario stored in the picture information storing means and the medium expanding time-lengths of the particular rich text media corresponding to the particular output format to the title reproducing terminal in response to the expanding time-length request, controlling the medium expanding means to convert one particular rich text medium to a display image suitable to the particular output format each time a medium expanding request sent from the title reproducing terminal is received, and sending the display image of one particular rich text medium to the title reproducing terminal at the display time of the particular rich text medium in response to each medium expanding request, and the title reproducing terminal comprising:

scheduling means for recognizing the display time of each particular rich text medium according to the scenario sent from the server and specifying a specific time earlier than the display time of one particular rich text medium by the medium expanding time-length of the particular rich text medium sent from the server for each particular rich text medium;

title control means for sending the expanding time-length request to the server, receiving the scenario and the medium expanding time-lengths of the particular rich text media corresponding to the particular output format from the server, sending one medium expanding request, which indicates to expand one particular rich text medium to a display image and to send the display image of the particular rich text medium to the title reproducing terminal at the display time of the particular rich text medium, to the server at the specific time of the particular rich text medium specified by the scheduling means for each particular rich text medium, and receiving the display image of each particular rich text medium at the display time of the particular rich text medium from the server; and medium displaying means for displaying the display image of one particular rich text medium received by the title control means at the display time of the particular rich text medium for each particular rich text medium to reproduce the particular multimedia title.

In the above configuration, when a user desires to reproduce a particular multimedia title at a particular output format in the title reproducing terminal of the user, an expanding time-length request is sent to the server. In the server, in cases where a medium expanding time-length of each particular rich text medium corresponding to the particular output format is not stored in the expanding time-length storing means, a medium expanding time-length of each particular rich text medium corresponding to the particular output format is calculated by the medium expanding means under the control of the server control means. In contrast, in cases where a medium expanding time-length of each particular rich text medium corresponding to the particular output format is stored in the expanding time-length storing means, the medium expanding time-length of each particular rich text medium corresponding to the particular output format is read out from the expanding time-length storing means. Thereafter, the medium expanding time-lengths calculated by the medium expanding means or read out from the expanding time-length storing means and a scenario specifying a display time of each particular rich text medium are sent to the title reproducing terminal.

In the title reproducing terminal, to display a display image of each particular rich text medium at its display time, it is required to start an expanding operation for each particular rich text medium at a specific time earlier than its display time by the medium expanding time-length of the particular rich text medium. Therefore, the specific time for each particular rich text medium is specified by the scheduling means, and a medium expanding request for requesting the expanding of each particular rich text medium is sent to the server at its specific time.

In the server, each particular rich text medium is converted to a display image suitable to the particular output format by the medium expanding means under the control of the server control means, and the display image of each particular rich text medium is sent to the title reproducing terminal at the display time of the particular rich text medium.

In the title reproducing terminal, the display image of each particular rich text medium is displayed by the medium displaying means at its display time.

Accordingly, each particular rich text medium of the particular multimedia title can be reliably displayed just at its display time, so that the particular multimedia title is reproduced.

BRIEF DESCRIPTION OF THE DRAWINGS

The objects, features and advantages of the present invention will be apparent from the following description taken in conjunction with the accompanying drawings, in which:

FIG. 3 is a block diagram of a picture information providing system according to a first embodiment of the present invention;

FIG. 6(*b*) shows a plurality of medium elements (or objects) obtained by decomposing the rich text medium;

FIG. 6(*c*) shows a dependence relationship among the objects;

FIG. 6(*d*) shows a distribution diagram of the objects obtained from the dependence relationship;

FIG. 6(*e*) shows a dependence relationship among operations;

FIG. 6(*f*) shows an image-drawing tree of one rich text medium;

FIG. 7A shows a list of image-drawing operations;

FIG. 7B shows a list of expanding time-lengths;

FIG. 7C shows a list of medium decoders;

FIG. 10 is a block diagram of a picture information providing system according to a second embodiment of the present invention;

FIG. 11 is a block diagram of a picture information providing system according to a third embodiment of the present invention;

FIGS. 12(a) to 12(f) shows a combining processing for combining two particular image-drawing operation trees into a combined image-drawing operation tree according to the third embodiment;

FIG. 17 shows a list of expanding time-lengths according to the fifth embodiment.

DETAILED DESCRIPTION OF THE EMBODIMENTS

Figure 1:
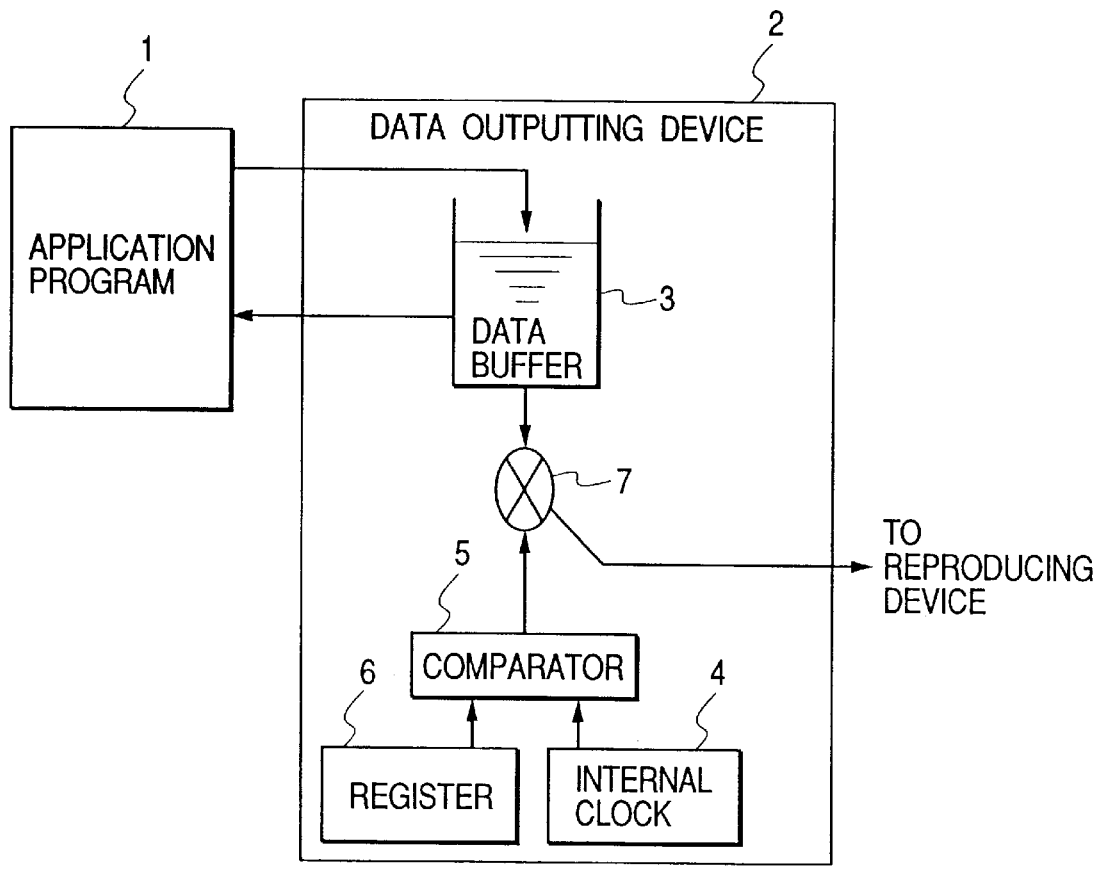
FIG. 1 is an explanatory view showing an output of multimedia data in a device of Published Unexamined Japanese Patent Application No. 6-214689 (1994) as a first prior art.
Figure 2:
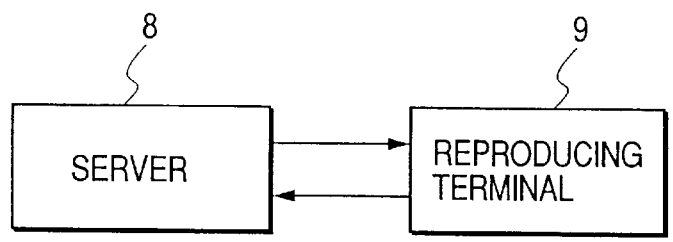
FIG. 2 is a block diagram of a conventional picture information providing system as a second prior art.

Preferred embodiments of a picture information providing system and a rich text medium displaying method according to the present invention are described with reference to the drawings.

In the following embodiments, each composing medium of a multimedia title is expressed by a word "rich text medium". Therefore, though each rich text composing one medium of a multimedia title is composed of characters, figures and ruled lines in the prior art, the multimedia title is composed of one or more rich text materials, which each are composed of characters, ruled lines, one or more lines, one or more still pictures, one or more moving pictures, one or more sounds and the like, in the present invention. Each composing element (such as character, rule line, line, still picture, moving picture, sound and the like) of the rich text material is called an object.

First Embodiment

FIG. 3 is a block diagram of a picture information providing system according to a first embodiment.

As shown in FIG. 3, a picture information providing system 100 comprises a multimedia title producing terminal 20 for producing rich text media of a multimedia title for each multimedia title;

a server 10 for receiving the rich text media of the multimedia title and a scenario specifying a plurality of display times of the rich text media from the multimedia title producing terminal 20 for each multimedia title, measuring a medium expanding time-length required to expand each rich text medium to a display image suitable to an output format in advance or in response to an expanding time-length request, outputting a scenario specifying a plurality of display times of a plurality of particular rich text media of a particular multimedia title desired by a user and a plurality of medium expanding time-lengths of the particular rich text media in response to the expanding time-length request, expanding each particular rich text medium of the particular multimedia title to a display image suitable to the output format in response to a medium expanding request and outputting the display images of the particular rich text media as picture information; and a multimedia title reproducing terminal 30 for outputting the expanding time-length request and an identification number of the particular multimedia title to the server 10, receiving the scenario of the rich text media of the particular multimedia title and the medium expanding time-length of each particular rich text medium from the server 10, outputting the medium expanding request to the server 10 at a specific time to display an display image of one particular rich text medium just at a display time of the particular rich text medium specified in the scenario for each particular rich text medium, receiving the display image of one particular rich text medium from the server 10 for each particular rich text medium, and displaying the display image of each particular rich text medium output from the server 10 on a display at the display time to reproduce the particular multimedia title.

The multimedia title producing terminal 20 comprises:

a multimedia title producing unit 21 for producing the multimedia title; and a registering unit 22 for registering the multimedia title produced in the multimedia title producing unit 21.

The server 10 comprises:

a multimedia server 11 for controlling various operations of the server 10 and managing the multimedia title produced in the multimedia title producing terminal 20;

a scenario/medium storing unit 14 for storing the scenario transmitted from the multimedia title producing terminal 20 for each multimedia title and storing the rich text media produced in the producing terminal 20 for each multimedia title;

a medium expanding unit 12 for reading out the rich text media from the scenario/medium storing unit 14 in an object expanding time-length registering operation, decomposing each rich text medium into objects, preparing an image-drawing operation tree of image-drawing operations respectively performed to expand one object to a drawing image, expanding each object to a drawing image according to one image-drawing operation of the image-drawing operation tree to measure an object expanding time-length required to expand each object to a drawing image, reading out the particular rich text media of the particular multimedia title from the scenario/medium storing unit 14 in response to the expanding time-length request, decomposing each particular rich text medium into objects, preparing a particular image-drawing operation tree of particular image-drawing operations from each particular rich text medium, calculating a medium expanding time-length required to expand each particular rich text medium to a display image by summing up the object expanding time-length of the particular image-drawing operations of particular image-drawing operation tree, outputting the medium expanding time-length of each particular rich text medium to the reproducing terminal 30, and expanding each particular rich text medium to a display image in response to the medium expanding request; and an expanding time-length library 13 for storing the object expanding time-lengths of the image-drawing operations measured in the medium expanding unit 12 for each rich text medium.

The multimedia title reproducing terminal 30 comprises a title control unit 31 for outputting the expanding time-length request and the identification number of the particular multimedia title to the server 10, receiving the scenario of the particular rich text media of the particular multimedia title and the medium expanding time-lengths of the particular rich text media of the particular multimedia title from the server 10, receiving the display image of each particular rich text medium of the particular multimedia title from the server 10 and controlling a reproducing operation of the multimedia title;

a medium display scheduler 32 for storing the scenario of the particular rich text media of the particular multimedia title and the medium expanding time-length of each particular rich text medium received in the title control unit 31, outputting one medium expanding request to the server 10 at a specific time earlier than one display time of one particular rich text medium by one medium expanding time-length of the particular rich text medium for each particular rich text medium, and outputting a display instruction to the title control unit 31 at the display time of one particular rich text medium for each rich text medium; and an expanded medium displaying unit 33 for displaying the display image of each particular rich text medium at its display time under the control of the title control unit 31 to reproduce the particular multimedia title.

In the above configuration, a multimedia title including rich text media is produced in the multimedia title producing unit 21 and is registered in the registering unit 22. Thereafter, the rich text media of the multimedia title and a scenario specifying a plurality of display times of the rich text media are transmitted to the server 10, and an expanding time-length calculation operation is performed in the server 10.

Figure 4A:
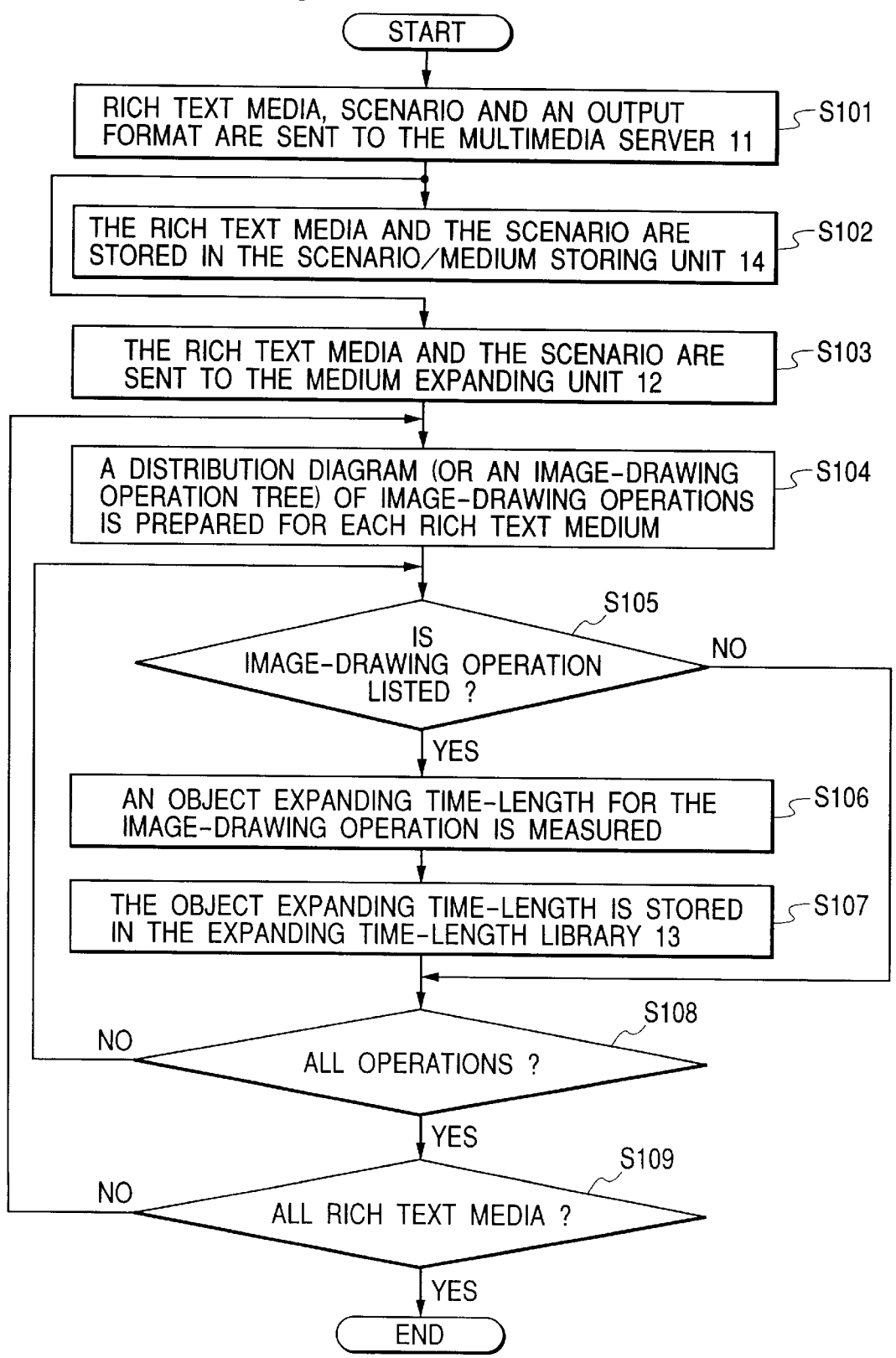
FIG. 4A is a flow chart showing an object expanding time-length registering operation performed in the picture information providing system.
Figures 4B, 5A, 5B:
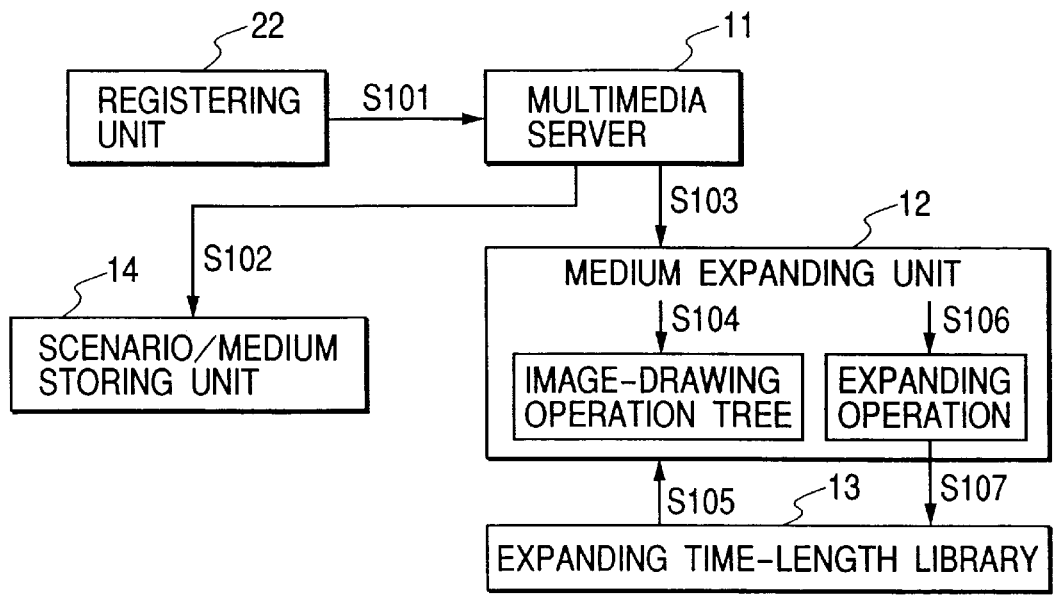
FIG. 4B shows one or more units relating to each step of the object expanding time-length registering operation.
FIG. 5A shows a data structure of rich text media.
FIG. 5B shows a data structure of a scenario composed of scenario elements.

FIG. 4A is a flow chart showing an object expanding time-length registering operation performed in the server 10, and FIG. 4B shows one or more units relating to each step of the object expanding time-length registering operation.

As shown in FIG. 4A, the rich text media of the multimedia title, the scenario of the multimedia title and an output format for the rich text media determined in the multimedia title producing terminal 20 (called an output format of the producing terminal 20) are sent from the producing terminal 20 to the multimedia server 11 (step S101). Thereafter, the rich text media of the multimedia title and the scenario of the rich text media are stored in the scenario/medium storing unit 14 for each of multimedia titles sent from the producing terminal 20 (step S102). A data structure of the rich text media stored in the scenario/medium storing unit 14 is shown in FIG. 5A. As shown in FIG. 5A, each rich text medium is listed with a medium identification number (medium ID) and a medium decoder identification number (medium decoder ID) indicating a decoding type of the medium. Also, a data structure of the scenario stored in the scenario/medium storing unit 14 is shown in FIG. 5B. As shown in FIG. 5B, a scenario element corresponding to each rich text medium is listed with a scenario element identification number (scenario element ID).

Also, the multimedia server 11 sends the rich text media and the output format of the producing terminal 20 sent from the registering unit 22 to the medium expanding unit 12 (step S103). In the medium expanding unit 12, each rich text medium is decomposed into a plurality of medium elements (or called objects), and a distribution diagram of a plurality of image-drawing operations is prepared for each rich text medium (step S104). Each image-drawing operation denotes an operation performed to convert one medium element into a drawing image, and the distribution diagram indicates a dependence relationship among the image-drawing operations. This distribution diagram is called an image-drawing operation tree.

The preparation of the image-drawing operation tree is described in detail with reference to FIGS. 6(a) to 6(f) and FIGS. 7A to 7C.

Figures 6A, 6B, 6C:
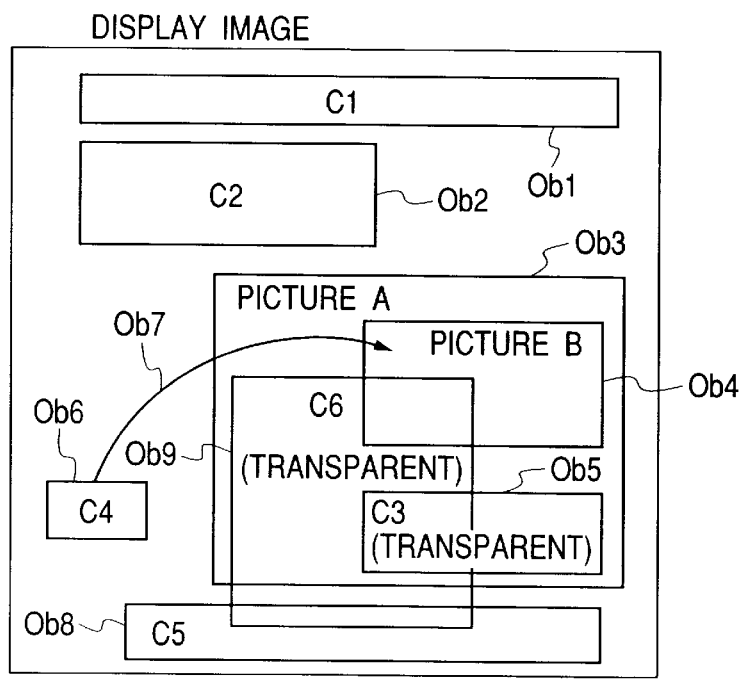
FIG. 6(*a*) shows a display image of a rich text medium.

In cases where one rich text medium composed of a plurality of medium elements (or objects) is converted into a display image shown in FIG. 6(a), the rich text medium is decomposed into an object Ob1: a character string C1 expressed by a first type of font A, an object Ob2: a character string C2 expressed by a second type of font B, an object Ob3: a still picture A, an object Ob4: a still picture B placed over a portion of the picture A, an object Ob5: a character string C3 expressed by a third type of font C and placed over another portion of the picture A on condition that the portion of the picture A is visible through a transparency area of the character string C3, an object Ob6: a character string C4 expressed by a fourth type of font D, an object Ob7: a curved line image extending from the character string C4 to the still picture B while passing over the picture A and the picture B, an object Ob8: a character string C5 expressed by the first type of font A, and an object Ob9: a character string C6 expressed by the second type of font B and placed over another portion of the picture A, a portion of the picture B, an area of the character string C3 and an area of the character string C5 on condition that the portion of the picture A, the portion of the picture B, the area of the character string C3 and the area of the character string C5 are visible through a transparency area of the character string C6. Therefore, an object table shown in FIG. 6(b) is obtained.

Thereafter, a dependence relationship among the objects indicating overlapping conditions of the character strings and pictures is extracted from the display image of the rich text medium. Therefore, the dependence relationship shown in FIG. 6(c) is obtained. That is, because each of the character strings C1, C2 and C4 does not overlap with any character string or picture, each of the objects Ob1, Ob2 and Ob6 has no dependence relationship with another object. Also, because the picture A and the character string C5 respectively do not overlap with any character string or picture when the picture A and the character string C5 are drawn, each of the objects Ob3 and Ob8 has no dependence relationship with another object. Also, the picture B overlaps with the picture A when the picture B is drawn, the object Ob4 depends on the object Ob3. In the same manner, the object Ob5 depends on the object Ob3, the object Ob7 depends on the object Ob3 and the object Ob4, and the object Ob9 depends on the object Ob3, the object Ob4, the object Ob5 and the object Ob8.

Thereafter, a distribution diagram of the objects shown in FIG. 6(d) is prepared from the dependence relationship among the objects. That is, the objects Ob1, Ob2, Ob3, Ob6 and Ob8 are arranged to be independent of each other, the objects Ob4 and Ob5 are arranged to positions subordinated to the object Ob3 while the objects Ob4 and Ob5 are arranged to be independent of each other, the object Ob7 is arranged to a position subordinated to the object Ob4 because the object Ob7 depends on the objects Ob3 and Ob4, and the object Ob9 is arranged to a position subordinated to the objects Ob4, Ob5 and Ob8 because the object Ob9 depends on the objects Ob3, Ob4, Ob5 and Ob8.

Thereafter, a dependence relationship among operations shown in FIG. 6(e) is prepared from the dependence relationship among the objects and the object table. In each operation, one object is converted into one drawing image. For example, an operation for the object Ob1 is performed according to a command "font A" instructing the loading of the first type of font A and a command "character string C1" instructing the drawing of the character string C1. Also, an operation for the object Ob3 is performed according to a command "picture A" instructing the reading of the picture A from a file and a command "stretch St1" instructing the stretching of the picture A to a stretch St1. Also, an operation for the object Ob9 is performed according to a command "font B" instructing the loading of the second type of font B, a command "character string C6" instructing the drawing of the character string C6 and a command "AND" instructing the overlapped writing at a transparency condition.

Thereafter, the commands in the dependence relationship are classified into a first operation type depending on an output format and a second operation type not depending on an output format, commands depending on an output format remain in dependence relationship, and commands not depending on an output format are arranged as one group on a top position of the dependence relationship. For example, the commands "font A", "font B", "font C", "font D", "picture A" and "picture B" are classified into an operation type not depending on an output format. Therefore, as shown in FIG. 6(f), an image-drawing operation tree of the operations depending on an output format is obtained for each rich text medium. A time required to perform each of the operations not depending on an output format is sufficiently shorter than an object expanding time-length required to perform each of the operations depending on an output format. Each operation depending on an output format is called a image-drawing operation.

Thereafter, the medium expanding unit 12 refers a list of image-drawing operations stored in the expanding time-length library 13, and it is checked by the medium expanding unit 12 whether or not each image-drawing operation depending on the output format of the producing terminal 20 in the image-drawing operation tree is listed (step S105). In cases where one image-drawing operation is not listed, an object expanding time-length required to convert an object into a drawing image according to the image-drawing operation depending on the output format of the producing terminal 20 is not recorded in a list of object expanding time-lengths. Therefore, the image-drawing operation depending on the output format of the producing terminal 20 is performed in the medium expanding unit 12 to expand an object into a drawing image suitable to the output format of the producing terminal 20, and an object expanding time-length required to expand the object to the drawing image according to the image-drawing operation is measured (step S106). The object expanding time-length of the image-drawing operation depending on the output format of the producing terminal 20 is registered in the list of object expanding time-lengths arranged in the expanding time-length library 13. That is, the object expanding time-length of the image-drawing operation is stored in the expanding time-length library 13 (step S107).

In contrast, in cases where it is judged by the multimedia server 11 that all image-drawing operations of the image-drawing operation tree are registered in the list of image-drawing operations in the step S105 ("YES" in a step S108), any measurement of the object expanding time-length is not performed.

For example, a data structure in the expanding time-length library 13 is shown in FIG. 7A, FIG. 7B and FIG. 7C. In the expanding time-length library 13, an object expanding time-length depending on each output format is registered for each image-drawing operation in a list of object expanding time-lengths shown in FIG. 7C. In cases where an object expanding time-length of one image-drawing operation depending on the output format of the producing terminal 20 is registered in the list of object expanding time-lengths, an identification number of the image-drawing operation is registered in a list of image-drawing operations shown in FIG. 7A. Also, in cases where a rich text medium cannot be decomposed into a plurality of objects, any image-drawing operation tree of the rich text medium cannot be obtained. In this case, the rich text medium is expanded by a medium decoder of the medium expanding unit 12 to directly convert the rich text medium into a display image, and a medium expanding time-length of the rich text medium is measured for each output format. Each medium expanding time-length of the rich text medium is registered in the list of medium expanding time-lengths shown in FIG. 7C. Also, an identification number of the medium decoder used for the expanding of the rich text medium is registered in a list of medium decoders shown in FIG. 7B.

Thereafter, in cases where it is judged by the multimedia server 11 that the steps 104 to S108 are performed for all rich text media (step S109), the object expanding time-length registering operation for the multimedia title is completed.

Thereafter, a multimedia title reproducing operation is performed in the server 10 and the multimedia title reproducing terminal 30. The multimedia title reproducing operation is divided into an expanding time-length requesting operation of a first stage and a display image requesting operation of a second stage.

Figure 8A:
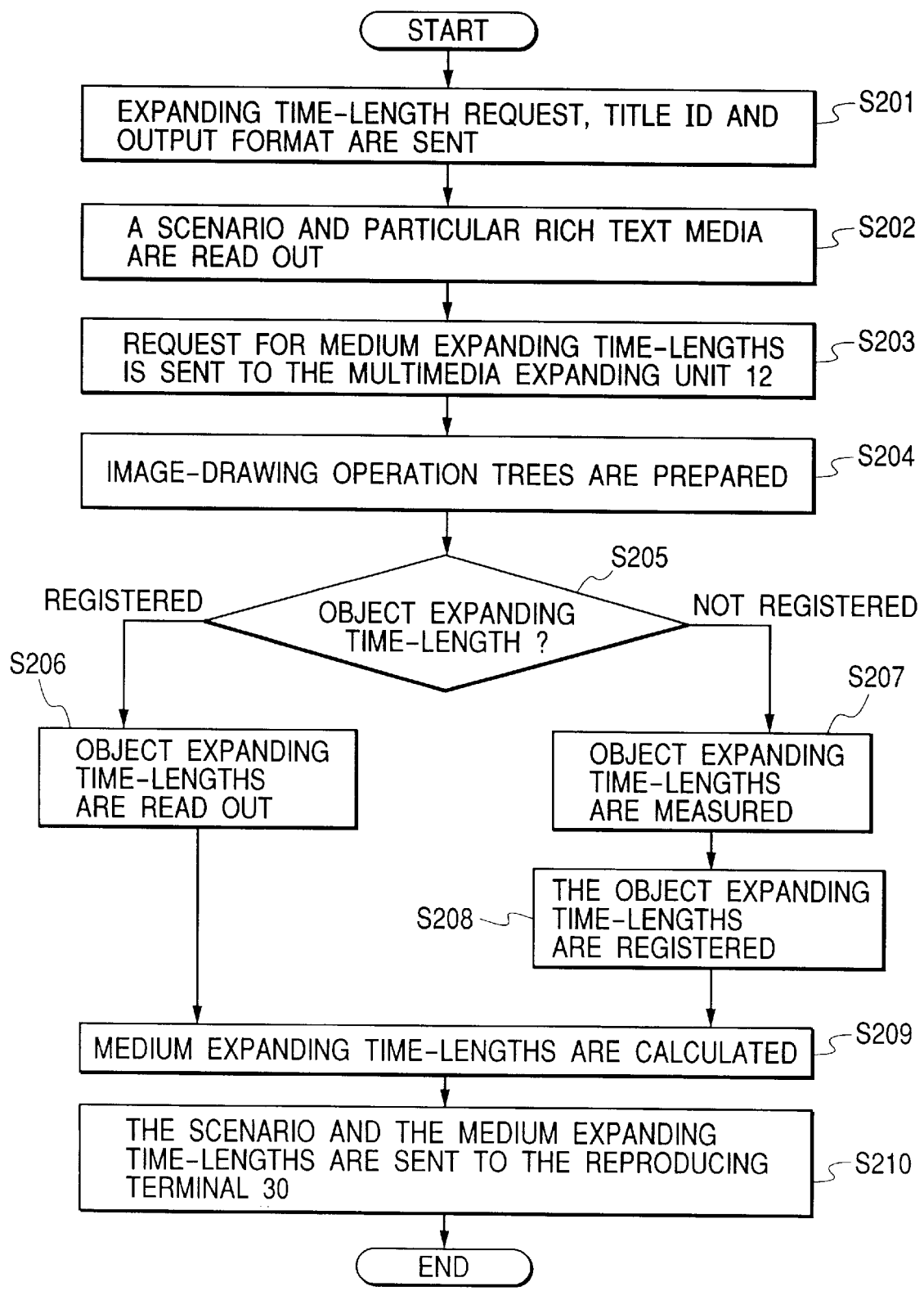
FIG. 8A is a flow chart showing an expanding time-length requesting operation.
Figure 8B:
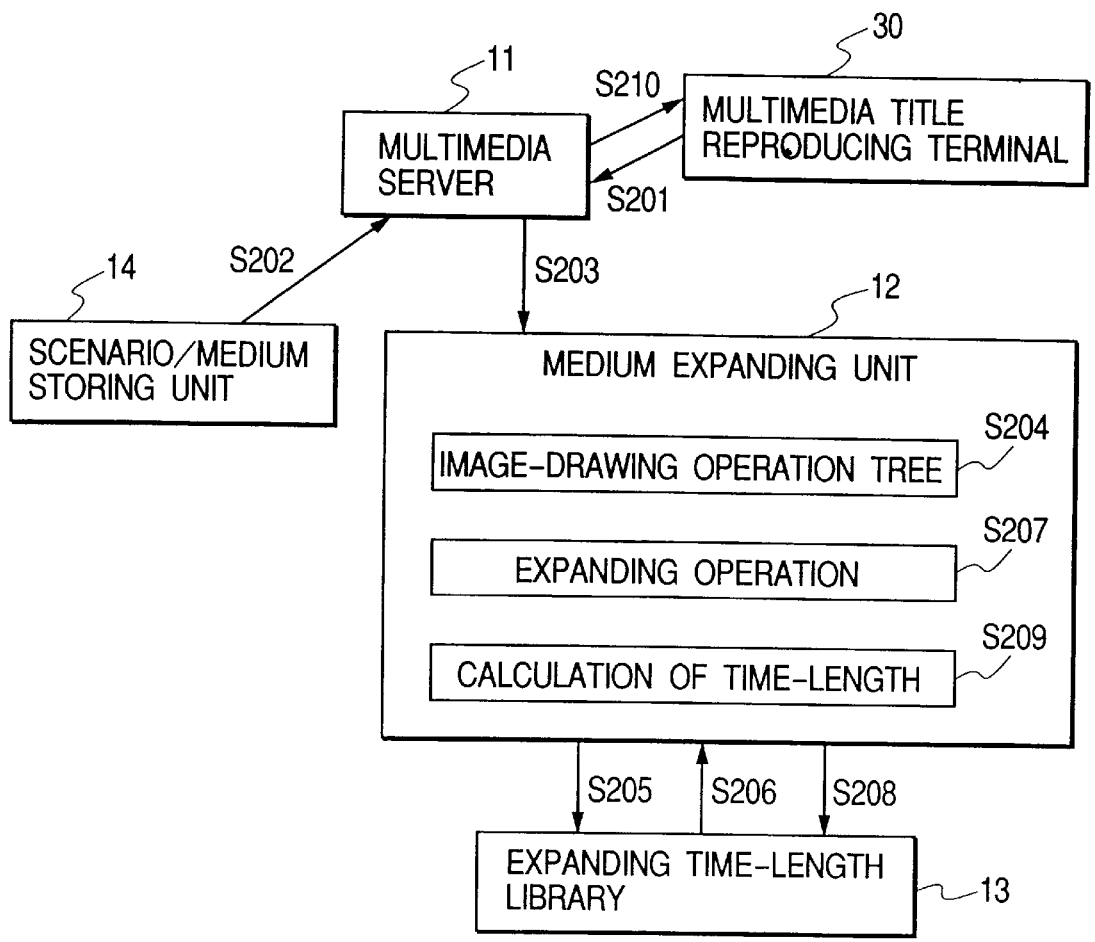
FIG. 8B shows one or more units relating to each step of the expanding time-length requesting operation.

FIG. 8A is a flow chart showing an expanding time-length requesting operation, and FIG. 8B shows one or more units relating to each step of the expanding time-length requesting operation.

As shown in FIG. 8A and FIG. 8B, when a user desires to reproduce a particular multimedia title, a title identification number (a title ID) of the particular multimedia title and an output format for the particular multimedia title determined in the multimedia title reproducing terminal 30 (called an output format of the reproducing terminal 30) are sent with an expanding time-length request from the title control unit 31 to the multimedia server 11 of the server 10 (step S201).

When the multimedia server 11 receives the title ID of the particular multimedia title and the output format of the reproducing terminal 30 with the expanding time-length request, a plurality of particular scenario elements of a scenario corresponding to particular rich text media of the particular multimedia title are read out from the scenario/medium storing unit 14 (step S202). Also, a plurality of particular rich text media of the particular multimedia title are read out from the scenario/medium storing unit 14 (step S202).

Thereafter, the multimedia server 11 delivers the rich text media and the output format of the producing terminal 30 to the medium expanding unit 12, and the multimedia server 11 requests the medium expanding unit 12 to calculate a medium expanding time-length of each particular rich text medium (step S203).

Thereafter, an image-drawing operation tree of a plurality of image-drawing operations depending on the output format of the producing terminal 30 is prepared for each particular rich text medium in the medium expanding unit 12 in the same manner as in the object expanding time-length registering operation (step S204). Thereafter, it is checked whether or not a plurality of object expanding time-lengths of the image-drawing operations of each image-drawing operation tree are registered in the expanding time-length library 13 (step S205). In cases where the object expanding time-lengths are registered in the expanding time-length library 13, the object expanding time-lengths of the image-drawing operations of each image-drawing operation tree are read out from the expanding time-length library 13 for each rich text medium (step S206). In contrast, in cases where an object expanding time-length of one image-drawing operation of one image-drawing operation tree is not registered in the expanding time-length library 13, an object expanding time-length of the image-drawing operation is measured by expanding an object of the particular rich text medium corresponding to the image-drawing operation tree to a drawing image according to the image-drawing operation (step S207).

For example, when a image-drawing operation tree shown in FIG. 6(*f*) is prepared from one particular rich text medium, the medium expanding unit 12 refers the image-drawing operation list (FIG. 7A) of the expanding time-length library 13, and it is checked by the medium expanding unit 12 whether or not an operation ID of each image-drawing operation corresponding to the command "character string C1", "character string C2" or "stretch St1" is registered in the image-drawing operation list. In cases where an operation ID of one image-drawing operation is registered in the image-drawing operation list, the medium expanding unit 12 refers the object expanding time-length list (FIG. 7B) of the expanding time-length library 13, the operation ID of the image-drawing operation is detected, and it is checked by the medium expanding unit 12 whether or not an object expanding time-length of the image-drawing operation depending on the output format of the producing terminal 30 is registered in the object expanding time-length list. In cases where an object expanding time-length of the image-drawing operation depending on the output format of the producing terminal 30 is registered in the object expanding time-length list, the object expanding time-length of the image-drawing operation is detected.

In contrast, in cases where an object expanding time-length of one image-drawing operation depending on the output format of the producing terminal 30 is not registered in the object expanding time-length list in the step S205 or in cases where an operation ID of one image-drawing operation is not registered in the image-drawing operation list of FIG. 7A in the step S205, the image-drawing operation is actually performed in the expanding unit 12 to convert an object into a drawing image suitable to the output format of the producing terminal 30, and an object expanding time-length required to expand an object to a drawing image according to the image-drawing operation is measured. Therefore, the object expanding time-length of the image-drawing operation is detected.

Thereafter, in a step S208, in cases where one or more object expanding time-lengths of image-drawing operations depending on the output format of the producing terminal 30 are measured by actually performing one or more image-drawing operations in the expanding unit 12, the object expanding time-lengths are sent to the expanding time-length library 13, and the object expanding time-lengths are registered in positions for the output format of the producing terminal 30 in the expanding time-length list. Also, an operation ID of each image-drawing operation is registered in the image-drawing operation list in cases where the operation ID of the image-drawing operation is not listed in the image-drawing operation list.

Thereafter, the object expanding time-lengths of the image-drawing operations in the image-drawing operation tree are summed for each particular rich text medium to calculate a medium expanding time-length of each particular rich text medium (step S209). The medium expanding time-length denotes a time-length required to convert one rich text medium into a display image composed of a plurality of drawing images of objects.

In cases where a image-drawing operation tree of one particular rich text medium cannot be prepared in the step S204 because the particular rich text medium cannot be decomposed into objects (or because a decoder for the particular rich text medium cannot be produced), it is checked whether or not a medium ID of the particular rich text medium is registered in the medium decoder list (FIG. 7C). In cases where a medium ID of the particular rich text medium is registered, a column for the medium ID of the particular rich text medium in the expanding time-length list (FIG. 7C) is found out, and a medium expanding time-length of the particular rich text medium depending on the output format of the reproducing terminal 30 is detected. In cases where a medium expanding time-length of the particular rich text medium depending on the output format of the reproducing terminal 30 is not registered in the expanding time-length list, a medium decoder for the particular rich text medium is detected from the medium decoder list, the particular rich text medium is actually converted into a display image suitable to the output format of the reproducing terminal 30 by using the medium decoder, a medium expanding time-length of the particular rich text medium depending on the output format of the reproducing terminal 30 is measured. The medium expanding time-length of the particular rich text medium is transmitted to the expanding time-length library 13, and the medium expanding time-length is registered in a position of the particular rich text medium for the output format of the producing terminal 30 in the expanding time-length list.

Thereafter, the medium expanding unit 12 informs the multimedia server 11 of the medium expanding time-lengths of the particular rich text media, the scenario of the particular rich text media and the medium expanding time-lengths of the particular rich text media are sent to the title control unit 31 of the multimedia title reproducing terminal 30, and the scenario of the particular rich text media and the medium expanding time-lengths of the particular rich text media are sent to the medium display scheduler 32 (step S210). Therefore, the expanding time-length requesting operation is completed.

Thereafter, a multimedia title reproducing operation is performed.

Figure 9C:
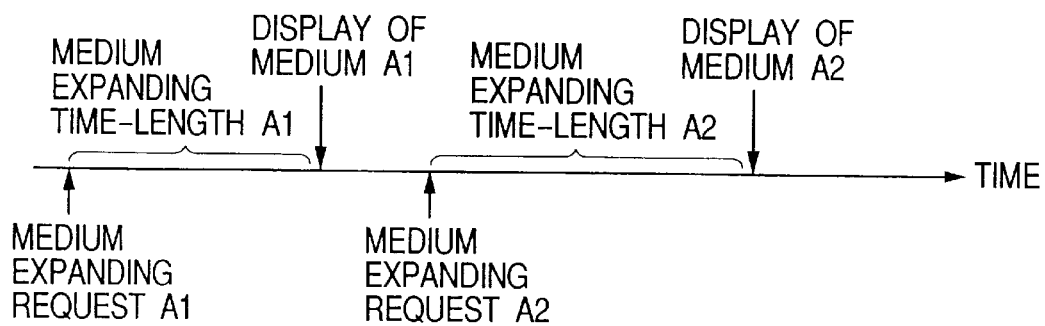
FIG. 9C shows a time relationship among a medium expanding request, a medium expanding time-length and the display of a rich text medium.
Figure 9A:
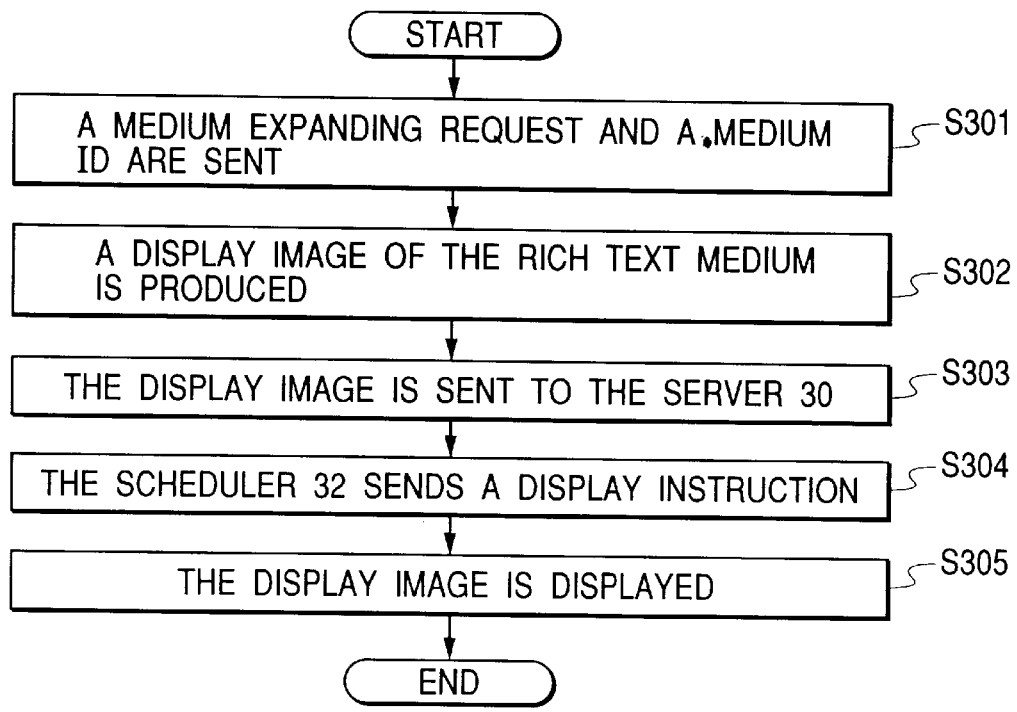
FIG. 9A is a flow chart showing a display image requesting operation.
Figure 9B:
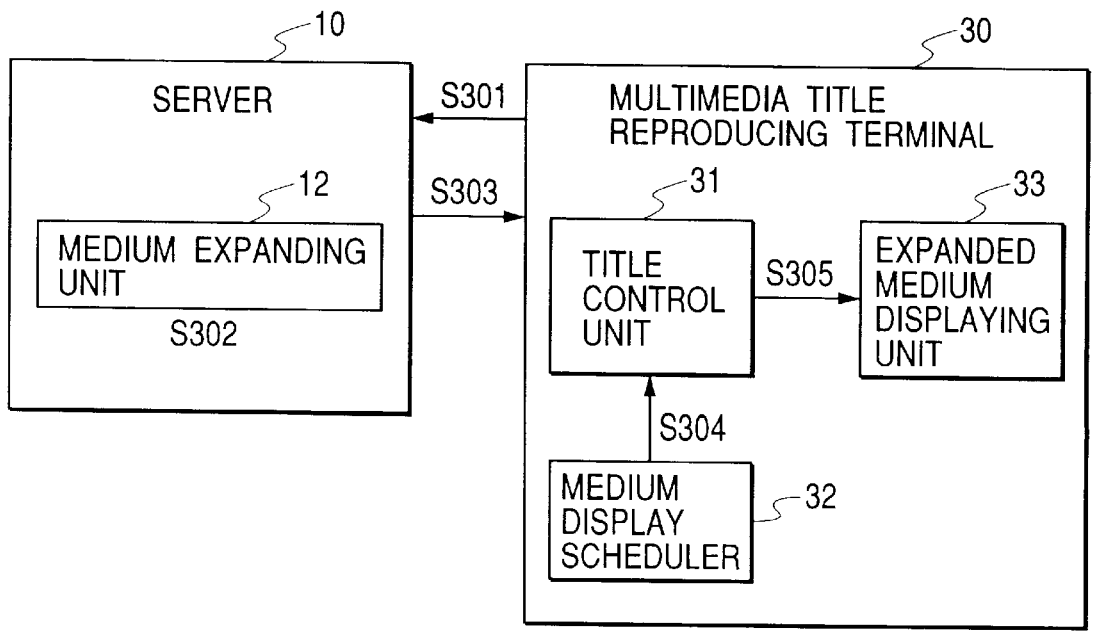
FIG. 9B shows one or more units relating to each step of the display image requesting operation.

FIG. 9A is a flow chart showing a display image requesting operation, and FIG. 9B shows one or more units relating to each step of the display image requesting operation.

In this embodiment, an expanding operation of one rich text medium is performed in the expanding unit 12 of the server 10 to produce a display image of the rich text medium, and the display image of the rich text medium is displayed in the multimedia title reproducing terminal 30. In this case, assuming that an expanding operation of the rich text medium is started at its display time in the server 10, because it takes a medium expanding time-length of the rich text medium to convert the rich text medium into the display image, the display image of the rich text medium cannot be displayed just at its display time.

To display a display image of each rich text medium just at its display time, as shown in FIG. 9C, it is required to send a medium expanding request to the server 10 at a specific time earlier than its display time in anticipation of its medium expanding time-length. Therefore, an expanding operation for each rich text medium performed in the server 10 is scheduled in the medium display scheduler 32. In detail, as shown in FIG. 9A and FIG. 9B, a specific time earlier than one display time by one medium expanding time-length is detected for each rich text medium, and a medium expanding request and a medium ID of one rich text medium are sent from the scheduler 32 to the server 10 at the specific time of the rich text medium for each rich text medium (step S301). The display time of each rich text medium is specified in the scenario. The medium expanding request and the medium ID are received in the expanding unit 12.

In the medium expanding unit 12, an expanding operation for the rich text medium identified by the medium ID is performed, and a display image of the rich text medium suitable to the output format of the reproducing terminal 30 is produced (step S302). That is, in cases where the rich text medium can be decomposed into a plurality of objects, an image-drawing operation tree of image-drawing operations suitable to the output format of the reproducing terminal 30 is prepared for the rich text medium in the same manner as in the step 204, each object is converted into a drawing image in one image-drawing operation of the tree, and the display image of the rich text medium is obtained by combining the drawing images of the objects with each other. Also, in cases where the rich text medium cannot be decomposed into a plurality of objects, the display image of the rich text medium is directly obtained. The display image of the rich text medium is sent from the expanding unit 12 to the title control unit 31 through the multimedia server 11 (step S303).

Thereafter, the scheduler 32 sends a display instruction to the title control unit 31 at the display time of the rich text medium (step S304), the display image of the rich text medium is sent from the title control unit 31 to the expanded medium displaying unit 33 according to the display instruction, and the display image of the rich text medium is displayed just at its display time for each rich text medium (step S305). Therefore, the multimedia title is reproduced in the multimedia title reproducing terminal 30.

Accordingly, when a user desires to reproduce a particular multimedia title, because a medium expanding time-length required to convert a particular rich text medium into a display image is calculated in advance in the server 10 for each particular rich text medium of the particular multimedia title, the medium expanding time-lengths of the particular rich text media can be received in the reproducing terminal 30 with a scenario specifying a display time of each particular rich text medium before the particular multimedia title is reproduced in the reproducing terminal 30. Therefore, the reproducing terminal 30 can request the server 10 at a specific time earlier than the display time of one particular rich text medium to send a display image of the particular rich text medium to the reproducing terminal 30 in time for the displaying of the display image of the particular rich text medium, so that the display image of each particular rich text medium can be displayed just at the display time of the particular rich text medium to reproduce the multimedia title according to the scenario.

In this embodiment, because a first calculation time-length required to combining a plurality of drawing images of objects of each rich text medium into a display image of the rich text medium is sufficiently shorter than a medium expanding time-length and because a second calculation time-length required to perform each of the operations not depending on an output format is sufficiently shorter than an object expanding time-length required to perform each of the image-drawing operations depending on an output format, the transmission of a medium expanding request and a medium ID of one rich text medium from the reproducing terminal 30 to the server 10 is performed at a specific time earlier than the display time of the rich text medium by the medium expanding time-length of the rich text medium in the step S301. However, it is applicable that a medium expanding request and a medium ID of one rich text medium be transmitted from the reproducing terminal 30 to the server 10 at a specific time earlier than the display time of the rich text medium by a total time-length obtained by summing up the medium expanding time-length of the rich text medium, the first calculation time-length, the second calculation time-length and a time-length required to transmit the medium expanding request and the medium ID.

Also, in FIG. 6(a) of this embodiment, each rich text medium is composed of objects such as characters, lines and pictures. However, it is applicable that each rich text medium be composed of objects like character, rule line, line, still picture, moving picture, sound and the like.

Second Embodiment

In this embodiment, one or more image-drawing operation trees prepared in the step S104 and/or one or more drawing images obtained in the step S106 or step S207 are temporarily recorded. Therefore, a calculation time required to calculate one medium expanding time-length of one rich text medium can be shortened by using the recorded image-drawing operation tree of the rich text medium, and one medium expanding time-length of one rich text medium can be shortened by using the recorded drawing images of objects of the rich text medium.

FIG. 10 is a block diagram of a picture information providing system according to a second embodiment.

As shown in FIG. 10, a picture information providing system 200 comprises the multimedia title producing terminal 20;

a server 210 for receiving the rich text media of the multimedia title and a scenario specifying a plurality of display times of the rich text media from the multimedia title producing terminal 20 for each multimedia title, measuring a medium expanding time-length required to expand each rich text medium to a display image suitable to an output format in advance or in response to an expanding time-length request, selecting one or more specific image-drawing operation trees and/or one or more specific drawing images from image-drawing operation trees and drawing images obtained in the measurement of the medium expanding time-lengths, temporarily storing the specific image-drawing operation trees and/or the specific drawing images, outputting a scenario specifying a plurality of display times of a plurality of particular rich text media of a particular multimedia title desired by a user and a plurality of medium expanding time-lengths of the particular rich text media in response to the expanding time-length request, expanding each particular rich text medium of the particular multimedia title to a display image at a specific time earlier than the display time of the particular rich text medium in response to a medium expanding request while using one or more specific image-drawing operation trees and/or one or more specific drawing images relating to the particular rich text media to shorten a calculation time-length required to obtain the display images, and outputting the display image of each particular rich text medium as picture information at the display time of the particular rich text medium; and the multimedia title reproducing terminal 30.

The server 210 comprises:

the multimedia server 11; the scenario/medium storing unit 14; the medium expanding unit 12; the expanding time-length library 13;

a cache control unit 211 for detecting frequency in use of each image-drawing operation depending on one output format or frequency of the expanding of one rich text medium not decomposed in a plurality of objects each time the image-drawing operation depending on the output format or the expanding of the rich text medium is performed in the object expanding time-length registering operation or the multimedia title reproducing operation in the expanding unit 12, estimating an importance degree of each image-drawing operation of one image-drawing operation tree prepared in the object expanding time-length registering operation in the expanding unit 12, selecting one or more image-drawing operations of high frequencies and one or more image-drawing operations of high importance degrees as one or more specific image-drawing operations, selecting one or more rich text media of high frequencies as one or more specific rich text media, specifying one or more specific drawing images obtained in the specific image-drawing operations, specifying one or more specific display images obtained in the expanding of the specific rich text media, and controlling the expanding time-length library 13 to set an object expanding time-length of each specific image-drawing operation depending on one output format to zero and to set a medium expanding time-length of each specific rich text medium depending on one output format to zero; and a cache memory 212 for temporarily storing the image-drawing operation tree of each rich text medium prepared in the object expanding time-length registering operation (step S104) in the expanding unit 12, and storing the specific drawing images and display images selected in the cache control unit 211, the specific drawing images and display images relating to the particular rich text media of the particular multimedia title being used in the expanding unit 12 in the multimedia title reproducing operation to shorten a calculation time-length required to obtain the display images.

In the above configuration, each time one image-drawing operation depending on one output format is performed in the object expanding time-length registering operation or the multimedia title reproducing operation in the expanding unit 12, frequency in use of the image-drawing operation depending on the output format is incremented in the cache control unit 211. Also, each time the expanding of one rich text medium not decomposed into a plurality of objects is performed in the object expanding time-length registering operation or the multimedia title reproducing operation in the expanding unit 12 by using one medium decoder, frequency of the expanding of the rich text medium not decomposed into a plurality of objects is incremented in the cache control unit 211. Also, each time one image-drawing operation tree is prepared in the object expanding time-length registering operation in the expanding unit 12, an importance degree of each image-drawing operation of the tree is estimated in the cache control unit 211. As the number of one image-drawing operations depending on a remarked image-drawing operation in one image-drawing operation tree is increased, the importance degree of the remarked image-drawing operation is heightened. In the example shown in FIG. 6(f), because four image-drawing operations depend on the image-drawing operation performed according to the command "stretch St1", the image-drawing operation of the command "stretch St1" has a high importance. Also, a group of the image-drawing operation of the command "stretch St1", the image-drawing operation of the command "stretch St2" and the image-drawing operation of the command "character string C3" has a high importance.

Thereafter, one or more specific drawing images obtained in one or more specific image-drawing operations of high frequencies or one or more specific image-drawing operations of high importance degrees are selected in the cache control unit 211, and one or more specific display images obtained in the expanding of one or more specific rich text media of high frequencies are selected in the cache control unit 211.

Thereafter, the specific drawing images and display images selected in the cache control unit 211 are temporarily stored in the cache memory 212. Also, one image-drawing operation tree is stored in the cache memory 212 each time the image-drawing operation tree is prepared in the step S104 of the object expanding time-length registering operation.

When the multimedia title reproducing operation is started, a plurality of particular image-drawing operation trees corresponding to the particular rich text media of the particular multimedia title desired by the user are read out from the cache memory 212. Therefore, a calculation time required to prepare the particular image-drawing operation trees in the step S204 of the expanding time receiving operation can be omitted. Thereafter, when the step S207 of the expanding time-length requesting operation is performed, because any of the expanding operations for the specific image-drawing operations and the expanding operations for the specific rich text medium is not required, an object expanding time-length of each specific image-drawing operation depending on one output format is set to zero, and a medium expanding time-length of each specific rich text medium not decomposed into a plurality of objects is set to zero.

Thereafter, when the display image requesting operation is started, because one or more specific drawing images and display images relating to the particular rich text media of the particular multimedia title are stored in the cache memory 212, any of the expanding operations for obtaining the specific drawing images and display images is not performed in the step S302, the specific drawing images are combined to produce one or more specific display images, and the specific display images are transmitted to the reproducing terminal 30.

Accordingly, one medium expanding time-length of one particular rich text medium can be shortened by using the specific drawing images of objects of the particular rich text medium, so that an expanded resource of the server 210 can be opened for another processing.

Also, all drawing images produced in the expanding unit 12 are not stored in the cache memory 212, but one or more drawing images corresponding to one or more image-drawing operations of high frequencies or high importance degrees are stored in the cache memory 212. Therefore, a recording capacity of the cache memory 212 is not increased so much, and a medium expanding time-length for each rich text medium can be effectively reduced.

In this embodiment, the specific drawing images, the specific display images and the image-drawing operation trees are stored in the cache memory 212. However, it is applicable that a display image of a specific rich text medium having a high priority obtained by combining a plurality of drawing images of objects of the specific rich text medium be stored in the cache memory 212. In this case, a medium expanding time-length of the specific rich text medium is set to zero.

Third Embodiment

There is a case that a plurality of display images of a plurality of rich text media are simultaneously displayed as a combined display image of a combined rich text medium. In this case, the combined display image is efficiently prepared in this embodiment.

FIG. 11 is a block diagram of a picture information providing system according to a third embodiment.

As shown in FIG. 11, a picture information providing system 300 comprises the multimedia title producing terminal 20; a server 310 for receiving the rich text media of the multimedia title and a scenario specifying a plurality of display times of the rich text media from the multimedia title producing terminal 20 for each multimedia title, measuring a medium expanding time-length required to expand each rich text medium to a display image suitable to an output format in advance or in response to an expanding time-length request, receiving medium IDs of a plurality of particular rich text media of a particular multimedia title desired by a user, identifying a display time common to the particular rich text media according to the scenario, calculating a combined medium expanding time-length for the particular rich text media, outputting the scenario specifying the common display time of the particular rich text media and the combined medium expanding time-length of the particular rich text media in response to the expanding time-length request, expanding the particular rich text media of the particular multimedia title to a combined display image suitable to the output format in response to a medium expanding request and outputting the combined display image of the particular rich text media as picture information; and the multimedia title reproducing terminal 30 for outputting the expanding time-length request and an identification number of the particular multimedia title to the server 310, receiving the scenario of the rich text media of the particular multimedia title and the combined medium expanding time-length of the particular rich text media from the server 310, outputting the medium expanding request to the server 310 at a specific time to display the combined display image of the particular rich text media just at the common display time of the particular rich text media specified in the scenario, receiving the combined display image of the particular rich text media from the server 310, and displaying the combined display image of the particular rich text media output from the server 310 on a display at the common display time to reproduce the particular multimedia title.

The server 310 comprises:

the multimedia server 11; the scenario/medium storing unit 14;

a medium expanding unit 311 for reading out a plurality of rich text media from the scenario/medium storing unit 14, decomposing each rich text medium into a plurality of objects, preparing an image-drawing operation tree of image-drawing operations respectively performed to convert one object into a drawing image, measuring an object expanding time-length required to expand each object to a drawing image according to one drawing operation of the image-drawing operation tree, reading out one scenario of the particular multimedia title and the particular rich text media of the particular multimedia title from the scenario/medium storing unit 14 in response to the expanding time-length request, identifying the common display time of the particular rich text media according to the scenario, decomposing each particular rich text medium into a plurality of objects, preparing a particular image-drawing operation tree of particular image-drawing operations for each particular rich text medium, combining the particular image-drawing operation trees of the particular rich text media into a combined image-drawing operation tree, calculating a combined medium expanding time-length required to expand a group of the particular rich text media to the combined display image by summing the object expanding time-lengths of the particular image-drawing operations of the combined image-drawing operation tree, expanding the particular rich text media to the combined display image at a specific time earlier than the common display time by the combined medium expanding time-length in response to the medium expanding request, and outputting the combined display image to the reproducing terminal 30 at the common display time; and the expanding time-length library 13.

In the above configuration, after the object expanding time-length registration operation shown in FIG. 4A is completed, when a user desires to reproduce a particular multimedia title of a plurality of particular rich text media planned to be displayed at a common display time specified in a scenario, the steps S201 to S204 are performed in the same manner as in the first embodiment. Thereafter, the particular image-drawing operation trees of the particular rich text media prepared in the step S204 are combined into a combined image-drawing operation tree. FIG. 12(a) to FIG. 12(f) show the combination of the particular image-drawing operation trees.

Figure 12A:
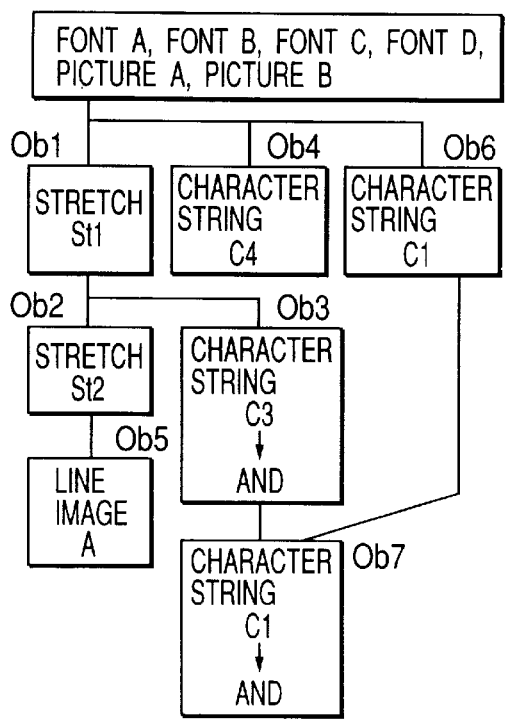
Figure 12B:
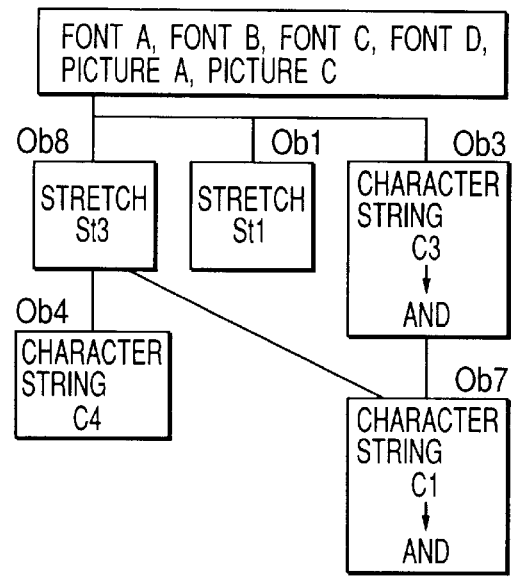
Figure 12F:
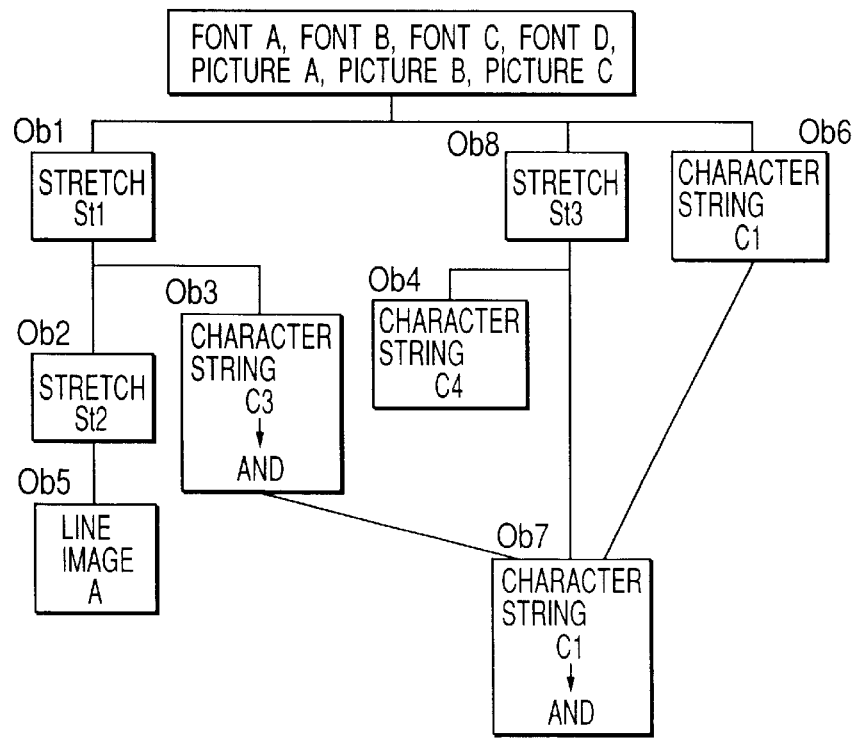

In cases where a first image-drawing operation tree shown in FIG. 12(a) and a second image-drawing operation tree shown in FIG. 12(b) are prepared in the step S204, a first dependence relationship among the objects shown in FIG. 12(c) corresponds to the first image-drawing operation tree, and a second dependence relationship among the objects shown in FIG. 12(d) corresponds to the second image-drawing operation tree. The first dependence relationship and the second dependence relationship are combined into a combined dependence relationship shown in FIG. 12(e) while a first object existing in the first dependence relationship and a second object existing in the second dependence relationship are set as one object in the combined dependence relationship in cases where the first and second objects are the same as each other. A combined image-drawing operation tree shown in FIG. 12(f) is prepared from the combined dependence relationship.

Thereafter, a combined medium expanding time-length required to expand a group of the particular rich text media to a combined display image is calculated by summing the object expanding time-lengths of the particular image-drawing operations of the combined image-drawing operation tree.

Thereafter, when a display image requesting operation is started, a medium expanding request is transmitted from the reproducing terminal 30 to the server 310 at a specific time earlier than the common display time of the particular rich text media by the combined medium expanding time-length, the objects of the particular rich text media are expanded, and the combined display image obtained by combining the display images of the particular rich text media are displayed in the reproducing terminal 30 to reproduce the particular multimedia title.

Accordingly, because an expanding operation for one object existing in a plurality of particular rich text media is performed only once, the display of a combined rich text medium obtained by combining a plurality of rich text media can be efficiently performed.

The third embodiment is based on the inventive concept of the first embodiment. However, it is applicable that the third embodiment be based on the inventive concept of the second embodiment.

Figure 13:
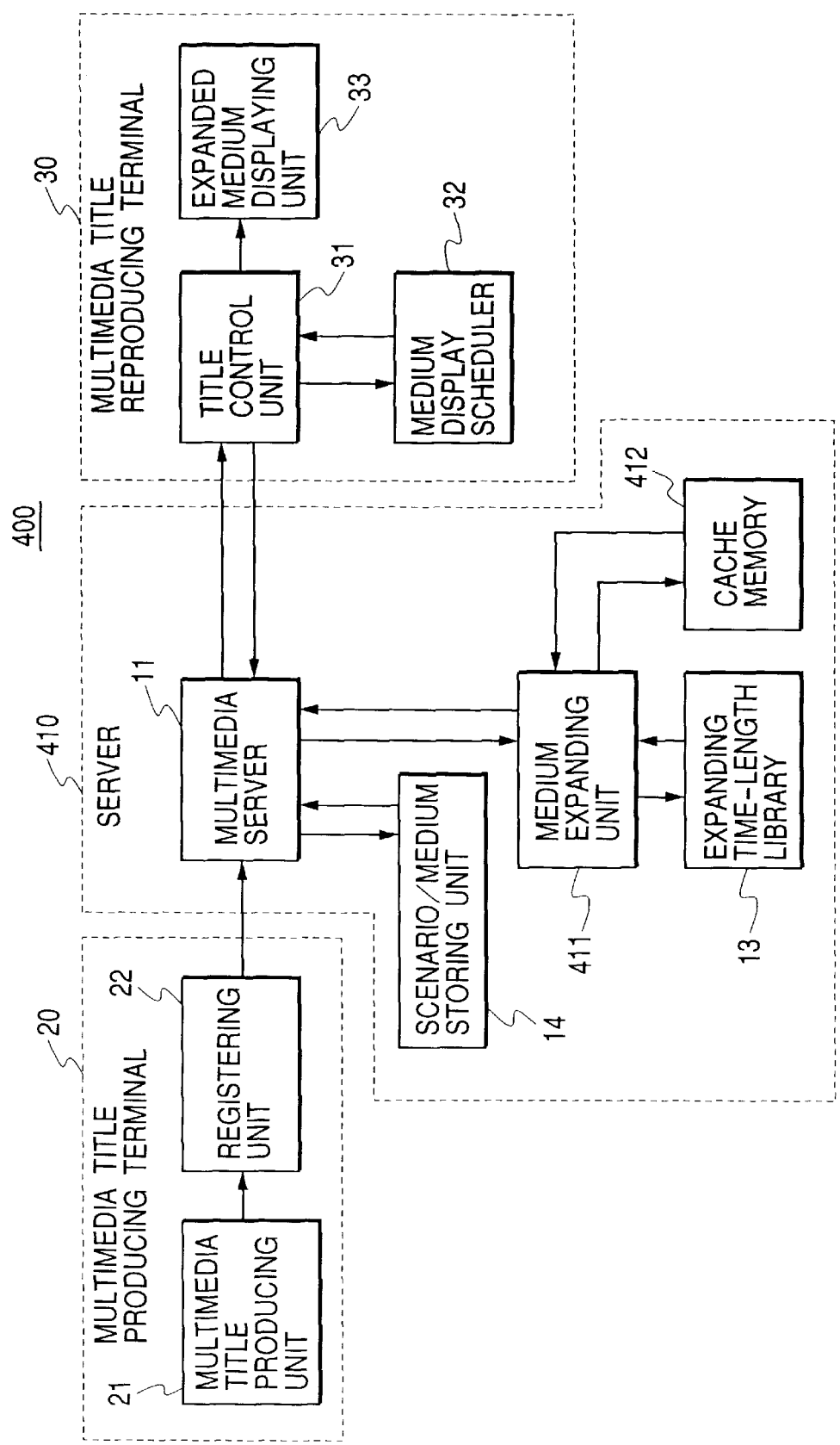
FIG. 13 is a block diagram of a picture information providing system according to a modification of the third embodiment of the present invention.

FIG. 13 is a block diagram of a picture information providing system according to a modification of the third embodiment.

As shown in FIG. 13, a picture information providing system 400 comprises the multimedia title producing terminal 20;

a server 410 for receiving the rich text media of the multimedia title and a scenario specifying a plurality of display times of the rich text media from the multimedia title producing terminal 20 for each multimedia title, measuring a medium expanding time-length required to expand each rich text medium to a display image suitable to an output format in advance or in response to an expanding time-length request, receiving medium IDs of a plurality of particular rich text media of a particular multimedia title desired by a user, identifying a display time common to the particular rich text media according to the scenario, calculating a combined medium expanding time-length for the particular rich text media, specifying one or more common objects respectively existing in each of the particular rich text media, selecting one or more specific drawing images of the common objects from drawing images obtained in the measurement of the medium expanding time-lengths, outputting the scenario specifying the common display time of the particular rich text media and the combined medium expanding time-length in response to the expanding time-length request, expanding the particular rich text media of the particular multimedia title to a combined display image suitable to the output format in response to a medium expanding request transmitted from the reproducing terminal 30 at a specific time earlier than the common display time by the combined medium expanding time-length while using one or more specific drawing images to shorten a calculation time-length required to the expanding of the particular rich text media, and outputting the combined display image of the particular rich text media as picture information at the common display time; and the multimedia title reproducing terminal 30.

The server 410 comprises:

the multimedia server 11; the scenario/medium storing unit 14;

a medium expanding unit 411 for reading out a plurality of rich text media from the scenario/medium storing unit 14, decomposing each rich text medium into a plurality of objects, preparing an image-drawing operation tree of image-drawing operations respectively performed to convert one object into a drawing image, measuring an object expanding time-length required to expand each object to a drawing image according to one drawing operation of the image-drawing operation tree, reading out one scenario of the particular multimedia title and the particular rich text media of the particular multimedia title from the scenario/medium storing unit 14 in response to the expanding time-length request, identifying the common display time of the particular rich text media according to the scenario, decomposing each particular rich text medium into a plurality of objects, preparing a particular image-drawing operation tree of particular image-drawing operations for each particular rich text medium, combining the particular image-drawing operation trees of the particular rich text media into a combined image-drawing operation tree while setting each common object existing in each of the particular rich text media as one object, calculating a combined medium expanding time-length required to expand a group of the particular rich text media to the combined display image by summing the object expanding time-lengths of the particular image-drawing operations of the combined image-drawing operation tree, and expanding the particular rich text media to the combined display image in response to the medium expanding request;

the expanding time-length library 13; and a cache memory 412 for temporarily storing common drawing images of the common objects obtained in the calculation of the combined medium expanding time-length in the medium expanding unit 411, the common display images being used in the expanding unit 411 in the multimedia title reproducing operation to shorten a calculation time-length required to obtain the combined display image.

In the above configuration, when a plurality of particular image-drawing operation trees of the particular rich text media prepared in the step S204 are combined into a combined image-drawing operation tree of a combined rich text medium in the medium expanding unit 411, one or more common objects respectively existing in each of the particular rich text media are specified. Thereafter, when each object of the combined rich text medium is expanded to a drawing image according to one image-drawing operation of the combined image-drawing operation tree to calculate a combined medium expanding time-length of the particular rich text media, one or more common drawing images of the common objects are temporarily stored in the cache memory 412. Thereafter, when a combined display image of the particular rich text media is prepared by expanding each object of the combined rich text medium to a drawing image, the common drawing images are used. Therefore, the expanding of each common object is not required in the step S302 of the display image requesting operation.

Accordingly, the display of a combined rich text medium obtained by combining a plurality of rich text media can be more efficiently performed.

Fourth Embodiment

In this embodiment, a plurality of image-drawing operations of an image-drawing operation tree corresponding to a rich text medium are divided into a first group of image-drawing operations and a second group of image-drawing operations, the image-drawing operations of the first group are performed in a server, and the image-drawing operations of the second group are performed in a multimedia title reproducing terminal. Therefore, because a medium expanding time of the rich text medium is divided into two expanding times, the expanding time in the server can be shortened.

Figure 14:
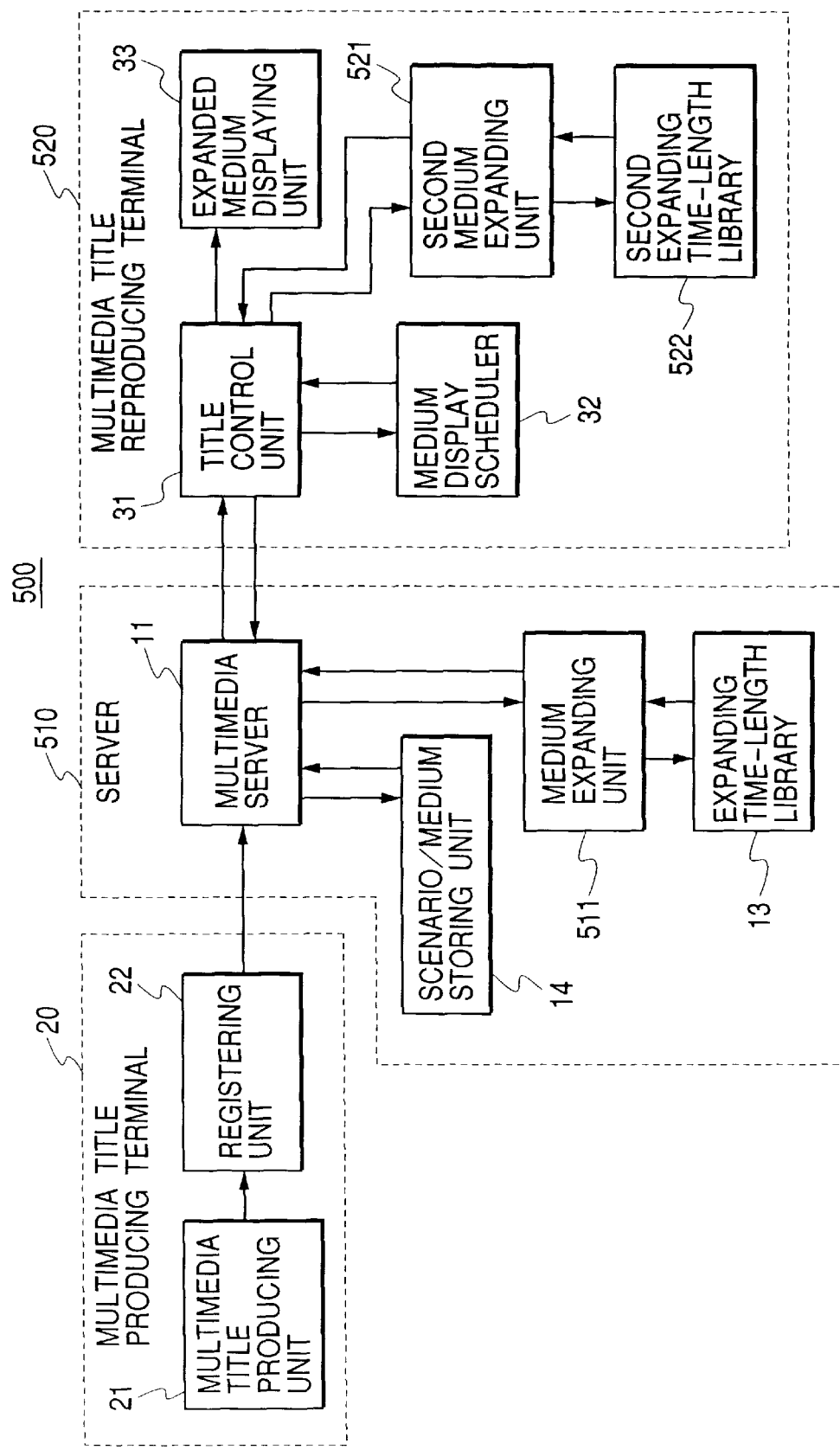
FIG. 14 is a block diagram of a picture information providing system according to a fourth embodiment of the present invention.

FIG. 14 is a block diagram of a picture information providing system according to a fourth embodiment.

As shown in FIG. 14, a picture information providing system 500 comprises the multimedia title producing terminal 20; a server 510 for preparing a particular image-drawing operation tree corresponding to each particular rich text medium of a particular multimedia title desired by a user, calculating a medium expanding time-length of each particular rich text medium by summing up a plurality of object expanding time-lengths of a plurality of particular image-drawing operations of the particular image-drawing operation tree, dividing the particular image-drawing operations of each particular image-drawing operation tree into a first group of particular image-drawing operations corresponding to first objects of the particular rich text medium and a second group of particular image-drawing operations corresponding to second objects of the particular rich text medium on condition that a first medium expanding time-length of the first objects of the particular rich text medium is almost equal to a second medium expanding time-length of the second objects of the particular rich text medium, and expanding the first objects of the particular rich text medium to a plurality of first drawing images; and a multimedia title reproducing terminal 520 for expanding the second objects of the particular rich text medium to a plurality of second drawing images, combining the first drawing images obtained in the server 510 and the second drawing images to produce a display image of the particular rich text medium, and displaying the display image of each particular rich text medium on a display at its display time to reproduce the particular multimedia title.

The server 510 comprises:

the multimedia server 11; the scenario/medium storing unit 14;

a medium expanding unit 511 for reading out the rich text media from the scenario/medium storing unit 14 in an object expanding time-length registering operation, decomposing each rich text medium into objects, preparing an image-drawing operation tree of image-drawing operations respectively performed to expand one object to a drawing image, expanding each object to a drawing image according to one image-drawing operation of the image-drawing operation tree to measure an object expanding time-length required to expand each object to a drawing image, reading out the particular rich text media of the particular multimedia title from the scenario/medium storing unit 14 in response to the expanding time-length request, decomposing each particular rich text medium into objects, preparing a particular image-drawing operation tree of particular image-drawing operations from each particular rich text medium, calculating a medium expanding time-length of each particular rich text medium by summing up a plurality of object expanding time-lengths of a plurality of particular image-drawing operations of the image-drawing operation tree, dividing the particular image-drawing operations of each particular image-drawing operation tree into the first group of particular image-drawing operations and the second group of particular image-drawing operations on condition that a first medium expanding time-length obtained by summing up a plurality of first object expanding time-lengths of the first group of particular image-drawing operations is almost equal to a second medium expanding time-length obtained by summing up a plurality of second object expanding time-lengths of the second group of particular image-drawing operations, outputting the first medium expanding time-length to the reproducing terminal 520 for each particular rich text medium, outputting the second medium expanding time-length, the second objects and the second group of image-drawing operations to the reproducing terminal 520 for each particular rich text medium, and expanding the first objects of each particular rich text medium to first drawing images at a first specific time earlier than the display time of the particular rich text medium by the first medium expanding time-length in response to the medium expanding request; and the expanding time-length library 13.

The multimedia title reproducing terminal 520 comprises the title control unit 31; the medium display scheduler 32;

a second medium expanding unit 521 for expanding the second objects of each particular rich text medium to second drawing images at a second specific time earlier than the display time of the particular rich text medium by the second medium expanding time-length, and combining the first drawing images obtained in the medium expanding unit 511 and the second drawing images to produce a display image of each particular rich text medium;

a second expanding time-length library 522 for storing the second object expanding time-lengths of the second group of particular image-drawing operations measured in the second medium expanding unit 521 for each rich text medium; and the expanded medium displaying unit 33 for displaying the display image of each particular rich text medium at its display time under the control of the title control unit 31 to reproduce the particular multimedia title.

In the above configuration, after the object expanding time-length registration operation shown in FIG. 4A is completed, when a particular image-drawing operation tree of particular image-drawing operations is prepared from each particular rich text medium in the step S204 of the expanding time-length requesting operation, a medium expanding time-length of each particular rich text medium is calculated in the steps S205 to S209 in the same manner as in the first embodiment. Thereafter, the particular image-drawing operations of each particular image-drawing operation tree are divided into a first group of particular image-drawing operations and a second group of particular image-drawing operations on condition that a first medium expanding time-length obtained by summing up a plurality of first object expanding time-lengths of the first group of particular image-drawing operations is almost equal to a second medium expanding time-length obtained by summing up a plurality of second object expanding time-lengths of the second group of particular image-drawing operations. In this case, first objects of the rich text medium corresponding to the first group of particular image-drawing operations have no dependence relationship with second objects of the rich text medium corresponding to the second group of particular image-drawing operations.

Figure 15:
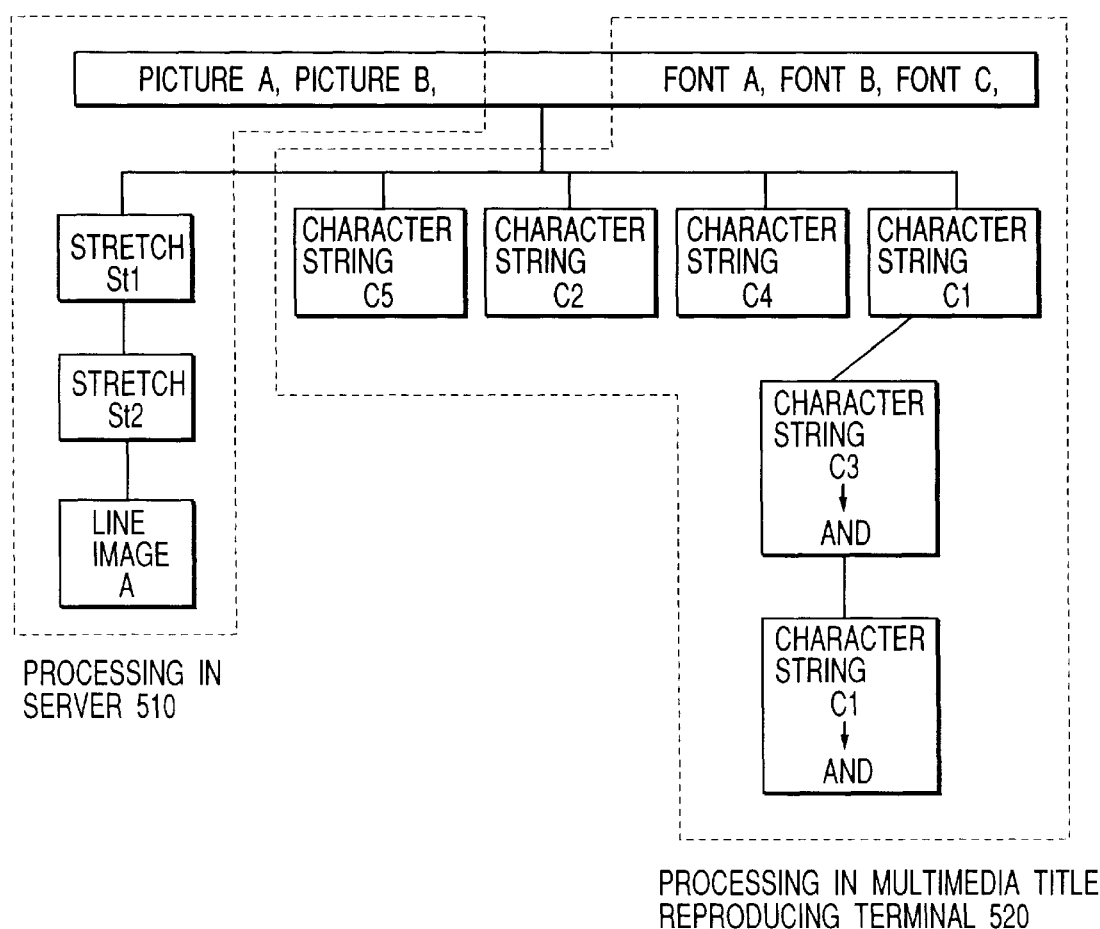
FIG. 15 shows a particular image-drawing operation tree in which a plurality of image-drawing operations are divided into two groups.

For example, when a particular image-drawing operation tree shown in FIG. 15 is prepared, a particular image-drawing operation of the command "stretch St1", a particular image-drawing operation of the command "stretch St2" and a particular image-drawing operation of the command "line image A" are set to a first group of particular image-drawing operations. Also, a particular image-drawing operation of the command "character string C5", a particular image-drawing operation of the command "character string C2", a particular image-drawing operation of the command "character string C4", a particular image-drawing operation of the command "character string C1", a particular image-drawing operation of the commands "character string C3" and "AND" and a particular image-drawing operation of the commands "character string C1" and "AND" are set to a second group of particular image-drawing operations.

Thereafter, the first objects of each particular rich text medium are expanded to first drawing images at a first specific time earlier than the display time of the particular rich text medium by the first medium expanding time-length in the step S302 of the display image requesting operation, and the first drawing images are transmitted to the multimedia title reproducing terminal 520 at the display time of the rich text medium.

Also, the second objects of each particular rich text medium are expanded to second drawing images in the second medium expanding unit 521 at a second specific time earlier than the display time of the particular rich text medium by the second medium expanding time-length. Thereafter, the second drawing images and the first drawing images are combined into a display image of the particular rich text medium at the display time in the title control unit 31 for each particular rich text medium, and the display image of each particular rich text medium is displayed in the expanded medium displaying unit 33.

Accordingly, because the expanding operation of each particular rich text medium is allocated to the server 510 and the multimedia title reproducing terminal 520, the expanding time-length of each particular rich text medium can be shortened.

Also, as shown in FIG. 15, in cases where image-drawing operations relating to character are performed in the reproducing terminal 520 and image-drawing operations relating to picture are performed in the server 510, operations (commands "picture A", "picture B", "font A", "font B" and "font C") not depending on an output format can be also divided into character operations (commands "font A", "font B" and "font C") performed in the reproducing terminal 520 and picture operations (commands "picture A", "picture B") performed in the server 510. Therefore, the expanding operation can be more efficiently performed in the reproducing terminal 520 and the server 510.

Fifth Embodiment

In cases where a particular output format different from an output format of the producing terminal 20 is specified by a multimedia title reproducing terminal, any object expanding time-lengths required to expand objects of each particular rich text medium of a particular multimedia title to drawing images suitable to the particular output format is not recorded in a server. In this case, it takes a lot of time to calculate a medium expanding time-length corresponding to the particular output format for each particular rich text medium in the same manner as in the first embodiment. In this embodiment, to efficiently operate the server, when a user desires to reproduce the particular multimedia title at the particular output format, the drawing images of the objects of each particular rich text medium are produced and stored in the server without calculating any medium expanding time-length of the particular rich text medium, and a display image obtained from the drawing images of each particular rich text medium is transmitted to the reproducing terminal when a medium reproducing request is received at the display time of the particular rich text medium from the reproducing terminal.

Figure 16:
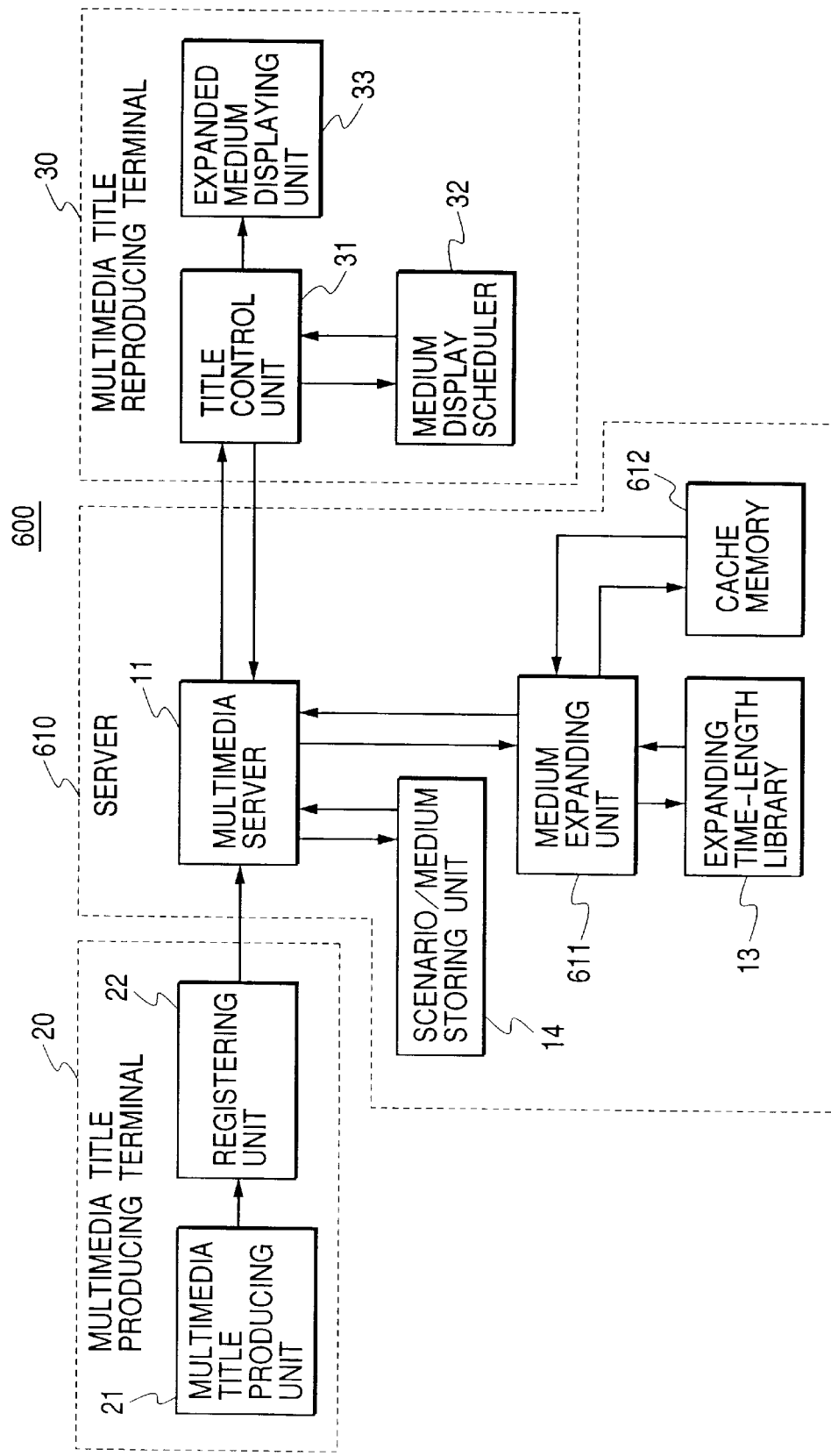
FIG. 16 is a block diagram of a picture information providing system according to a fifth embodiment of the present invention.

FIG. 16 is a block diagram of a picture information providing system according to a fifth embodiment of the present invention.

As shown in FIG. 16, a picture information providing system 600 comprises the multimedia title producing terminal 20;

a server 610 for receiving the rich text media of the multimedia title and a scenario specifying a plurality of display times of the rich text media from the multimedia title producing terminal 20 for each multimedia title, measuring a medium expanding time-length required to expand each rich text medium to a display image suitable to an output format of the producing terminal 20, receiving a title reproducing request indicating the reproduction of a display image suitable to a particular output format, preparing a particular image-drawing operation tree of a plurality of particular image-drawing operations corresponding to the particular output format for each particular rich text medium of a particular multimedia title desired by a user, extracting the particular image-drawing operations from each particular image-drawing operation tree, expanding a plurality of objects of each particular rich text medium to a plurality of drawing images suitable to the particular output format according to the particular image-drawing operations of the particular image-drawing operation tree, storing the drawing images of each particular rich text medium, outputting a medium expanding time-length set to zero for each particular rich text medium, outputting the scenario, producing a display image of each particular rich text medium from the drawing images of the particular rich text medium in response to a medium expanding request, and outputting the display image of each particular rich text medium; and the multimedia title reproducing terminal 30 for outputting the title reproducing request and the particular output format of the reproducing terminal 30 to the server 610 to receive the scenario and the medium expanding time-lengths set to zero and outputting the medium expanding request to the server 610 at a display time of each particular rich text medium to receive the display image of the particular rich text medium.

The server 610 comprises:

the multimedia server 11; the scenario/medium storing unit 14; the expanding time-length library 13;

a medium expanding unit 611 for reading out a plurality of rich text media from the scenario/medium storing unit 14, decomposing each rich text medium into a plurality of objects, preparing an image-drawing operation tree of image-drawing operations respectively performed to convert one object into a drawing image suitable to an output format of the producing terminal 20, measuring an object expanding time-length required to expand each object to a drawing image according to one drawing operation of the image-drawing operation tree, reading out one scenario of the particular multimedia title and the particular rich text media of the particular multimedia title from the scenario/medium storing unit 14 in response to the title reproducing request, recognizing that any object expanding time-length corresponding to the particular output format is not recorded in the expanding time-length library 13, preparing a particular image-drawing operation tree of a plurality of particular image-drawing operations corresponding to the particular output format for each particular rich text medium of a particular multimedia title desired by a user, extracting a plurality of particular image-drawing operations from each particular image-drawing operation tree, expanding a plurality of objects of each particular rich text medium to a plurality of drawing images suitable to the particular output format according to the particular image-drawing operations of the particular image-drawing operation tree, setting a plurality of medium expanding time-lengths of the particular rich text media to zero, outputting the scenario of the particular multimedia title and the medium expanding time-lengths to the reproducing terminal 30, producing a display image of each particular rich text medium from the drawing images of the particular rich text medium in response to a medium expanding request, and outputting the display image of each particular rich text medium to the reproducing terminal 30; and a cache memory 612 for temporarily storing the drawing images of the objects of the particular rich text media obtained in the medium expanding unit 611.

In the above configuration, after the object expanding time-length registration operation shown in FIG. 4A is completed, when the server 610 receives a particular output format different from an output format of the producing terminal 20 in the object expanding time-length registration operation with a title reproducing request and a title ID of a particular multimedia title, a plurality of object expanding time-lengths corresponding to the output format of the producing terminal 20 are measured and recorded in the object expanding time-length registration operation. Therefore, there is a case that any object expanding time-length corresponding to the particular output format of the reproducing terminal 30 is not recorded in the expanding time-length library 13. For example, as shown in FIG. 17, in cases where the particular output format corresponds to an output format-5, any object expanding time-length corresponding to the particular output format of the reproducing terminal 30 is not recorded in the expanding time-length library 13.

In this case, the medium expanding unit 611 recognizes that any object expanding time-length corresponding to the particular output format of the reproducing terminal 30 is not recorded in the expanding time-length library 13. Thereafter, in the medium expanding unit 611, an image-drawing operation tree of image-drawing operations is prepared for each particular rich text medium of the particular multimedia title, a plurality of particular image-drawing operations are extracted from each particular image-drawing operation tree, a plurality of objects of each particular rich text medium are expanded to a plurality of drawing images suitable to the particular output format according to the particular image-drawing operations of the particular image-drawing operation tree, and the drawing images of the particular multimedia title suitable to the particular output format are recorded in the cache memory 612. Also, a plurality of medium expanding time-lengths of the particular rich text media corresponding to the particular output format are set to zero, the medium expanding time-lengths set to zero are recorded in the expanding time-length library 13, and the scenario of the particular multimedia title and the medium expanding time-lengths set to zero are transmitted to the reproducing terminal 30.

Thereafter, when a medium expanding request transmitted from the reproducing terminal 30 is received in the multimedia server 11 at the display time of each particular rich text medium, a display image of the particular rich text medium is produced by combining the drawing images of the particular rich text medium recorded in the cache memory 612, and the display image of the particular rich text medium is output to the reproducing terminal 30.

Accordingly, even though a user desires to reproduce the particular multimedia title at the particular output format different from an output format of the producing terminal 20, because any medium expanding time-length corresponding to the particular output format is not calculated but because a plurality of objects of each particular rich text medium are expanded to drawing images suitable to the particular output format, the multimedia title reproducing operation can be efficiently performed.

Also, because the medium expanding time-lengths of the particular rich text media corresponding to the particular output format are set to zero, the medium expanding request is received in the multimedia server 11 at the display time of each particular rich text medium.

It is applicable that the inventive concept of the third embodiment and the inventive concept of the fifth embodiment be combined.

In this case, in the expanding time-length requesting operation performed in the expanding unit 611, it is checked whether or not the object expanding time-lengths of the objects of the particular rich text media corresponding to the output format of the reproducing terminal 30 are stored in the library 13, each particular rich text medium is decomposed into a plurality of objects in cases where any medium expanding time-length corresponding to the output format of the reproducing terminal 30 is not stored in the library 13, the scenario of the particular multimedia title is referred, it is detected that the display times of a plurality of specific rich text media selected from the particular rich text media agree with each other, an image-drawing operation tree of a plurality of image-drawing operations required to convert the objects of one particular rich text medium into a plurality of drawing images according to the output format of the reproducing terminal 30 is prepared for each of the particular rich text media other than the specific rich text media, each object of one particular rich text medium is expanded to a drawing image suitable to the output format of the reproducing terminal 30 according to one image-drawing operation of one image-drawing operation tree corresponding to the particular rich text medium for each of the particular rich text media other than the specific rich text media, a specific image-drawing operation tree of a plurality of specific image-drawing operations required to convert the objects of one specific rich text medium into a plurality of drawing images according to the output format of the reproducing terminal 30 is prepared for each specific rich text medium, a combined image-drawing operation tree of a plurality of specific image-drawing operations is prepared by combining a plurality of specific rich text media corresponding to the specific image-drawing operation trees into a combined rich text medium while setting each object common to two or more specific rich text media as one object in the combined rich text medium, each object of the combined rich text medium is expanded to a drawing image suitable to the output format of the reproducing terminal 30 according to one specific image-drawing operation of the combined image-drawing operation tree, the drawing images of the objects of the particular rich text media other than the specific rich text media and the drawing images of the objects of the combined rich text medium in the cache memory 612, an object expanding time-length of each object of the particular rich text media other than the specific rich text media corresponding to the output format of the reproducing terminal 30 is set to zero to set a medium expanding time-length of each of the particular rich text media other than the specific rich text media to zero, an object expanding time-length of each object of the combined rich text medium corresponding to the output format of the reproducing terminal 30 is set to zero to set a medium expanding time-length of the combined rich text medium to zero, the object expanding time-lengths of the objects of the particular rich text media and the combined rich text medium are stored in the library 13, and the medium expanding time-lengths of the particular rich text media other than the specific rich text media and the medium expanding time-length of the combined rich text medium are transmitted with the scenario of the particular multimedia title to the reproducing terminal 30.

Thereafter, in the display image requesting operation performed in the expanding unit 611, the drawing images of the objects of the particular rich text media other than the specific rich text media and the drawing images of the objects of the combined rich text medium are read out from the cache memory 612, the drawing images of the objects of one particular rich text medium are combined into a display image of the particular rich text medium for each of the particular rich text media other than the specific rich text media, the drawing images of the objects of the combined rich text medium are combined into a display image of the combined rich text medium, and the display images of the particular rich text media other than the specific rich text media and the display image of the combined rich text medium are transmitted to the reproducing terminal 30.

Therefore, display images of the specific rich text media can be simultaneously displayed in the displaying unit 33 as a combined display image.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A rich text medium displaying method, comprising the steps of:

calculating a medium expanding time-length required to expand each particular rich text medium of a particular multimedia title to a display image suitable to a particular output format of a title reproducing terminal in a server;

sending a scenario specifying a display time of each particular rich text medium and the medium expanding time-lengths of the particular rich text media from the server to the title reproducing terminal;

recognizing the display time of each particular rich text medium according to the scenario in the title reproducing terminal;

sending a medium expanding request, which indicates to expand one particular rich text medium to a display image and to send the display image of the particular rich text medium to the title reproducing terminal at the display time of the particular rich text medium, to the server at a specific time earlier than the display time of each particular rich text medium by the medium expanding time-length of the particular rich text medium;

converting one particular rich text medium to a display image suitable to the particular output format of the title reproducing terminal in the server each time the medium expanding request is received;

sending the display image of each particular rich text medium from the server to the title reproducing terminal at the display time of the particular rich text medium; and displaying the display image of each particular rich text medium at the display time of the particular rich text medium to reproduce the particular multimedia title.

2. A rich text medium displaying method according to claim 1 in which the step of calculating a medium expanding time-length comprises the steps of:

decomposing each particular rich text medium into a plurality of objects;

measuring an object expanding time-length, required to expand one object of one particular rich text medium to a drawing image, for each object of the particular rich text media; and adding up the object expanding time-lengths of the objects of one particular rich text medium for each particular rich text medium to obtain the medium expanding time-lengths of the particular rich text media.

3. A rich text medium displaying method according to claim 2 in which the step of measuring an object expanding time-length comprises the steps of:

dividing a plurality of operations required to convert the objects of each particular rich text medium into operations not depending on the particular output format of the title reproducing terminal and image-drawing operations depending on the particular output format of the title reproducing terminal;

preparing an image-drawing operation tree of the image-drawing operations according to the particular output format of the title reproducing terminal for each particular rich text medium; and expanding each object of one particular rich text medium to a drawing image according to one image-drawing operation of one image-drawing operation tree for each particular rich text medium to detect the object expanding time-lengths of the objects of the particular rich text media.

4. A rich text medium displaying method according to claim 1 in which the step of calculating a medium expanding time-length comprises the steps of:

storing an object expanding time-length, required to expand an object of one particular rich text medium to a drawing image according to each of a plurality of output formats, for each object of the particular rich text media;

selecting a plurality of particular object expanding time-lengths of the objects of the particular rich text media corresponding to the particular output format of the title reproducing terminal from the stored object expanding time-lengths corresponding to the output formats; and adding up the particular object expanding time-lengths of the objects of one particular rich text medium for each particular rich text medium to obtain the medium expanding time-lengths of the particular rich text media.

5. A rich text medium displaying method according to claim 1 in which the step of calculating a medium expanding time-length comprises the steps of:

storing an object expanding time-length, required to expand an object of one particular rich text medium to a drawing image according to each of a plurality of output formats, for each object of the particular rich text media;

checking whether or not a plurality of particular object expanding time-lengths of the objects of each particular rich text medium corresponding to the particular output format of the title reproducing terminal are included in the stored object expanding time-lengths of the particular rich text medium corresponding to the output formats;

measuring a particular object expanding time-length of each object of one particular rich text medium corresponding to the particular output format of the title reproducing terminal in cases where the particular object expanding time-lengths of the objects of the particular rich text medium corresponding to the particular output format of the title reproducing terminal are not included in the stored object expanding time-lengths of the objects of the particular rich text media corresponding to the output formats;

adding up the particular object expanding time-lengths of the objects of the particular rich text medium to obtain the medium expanding time-length of the particular rich text medium; and storing the particular object expanding time-lengths of the objects of the particular rich text medium corresponding to the particular output format of the title reproducing terminal.

6. A rich text medium displaying method according to claim 1 in which the step of calculating a medium expanding time-length comprises the steps of:

checking whether or not it is possible to decompose each particular rich text medium into a plurality of objects;

directly expanding one particular rich text medium to a display image in cases where it is impossible to decompose the particular rich text medium into a plurality of objects; and measuring a medium expanding time-length required to directly expand the particular rich text medium to the display image.

7. A rich text medium displaying method according to claim 1 in which the step of calculating a medium expanding time-length comprises the steps of:

checking whether or not it is possible to decompose each particular rich text medium into a plurality of objects;

storing a medium expanding time-length, required to expand one particular rich text medium to a display image according to each of a plurality of output formats in cases where it is impossible to decompose the particular rich text medium into a plurality of objects; and selecting a particular medium expanding time-length corresponding to the particular output format of the title reproducing terminal from the stored medium expanding time-lengths corresponding to the output formats.

8. A rich text medium displaying method according to claim 1 in which the step of calculating a medium expanding time-length comprises the steps of:

checking whether or not it is possible to decompose each particular rich text medium into a plurality of objects;

storing a medium expanding time-length, required to expand one particular rich text medium to a display image according to each of a plurality of output formats in cases where it is impossible to decompose the particular rich text medium into a plurality of objects;

checking whether or not a particular medium expanding time-length of the particular rich text medium corresponding to the particular output format of the title reproducing terminal is included in the stored medium expanding time-lengths corresponding to the output formats;

directly expanding the particular rich text medium to a display image in cases where a particular medium expanding time-length of the particular rich text medium corresponding to the particular output format of the title reproducing terminal is not included in the stored medium expanding time-lengths corresponding to the output formats;

measuring a particular medium expanding time-length required to directly expand the particular rich text medium to the display image; and storing the particular medium expanding time-length of the particular rich text medium corresponding to the particular output format of the title reproducing terminal.

9. A rich text medium displaying method according to claim 1 in which the step of calculating a medium expanding time-length comprises the steps of:

decomposing each particular rich text medium into a plurality of objects;

expanding each object of one particular rich text medium to a drawing image suitable to the particular output format of the title reproducing terminal for each particular rich text medium;

selecting one or more specific drawing images of specific objects of a specific rich text medium from the drawing images of the particular rich text media;

storing the specific drawing images of the specific objects of the specific rich text medium in a storage medium;

measuring an object expanding time-length, required to expand one object of one particular rich text medium to a drawing image, for each object of the particular rich text media other than the specific objects of the specific rich text medium;

setting an object expanding time-length of each specific object to zero; and adding up the object expanding time-lengths of the objects of one particular rich text medium for each particular rich text medium to obtain the medium expanding time-lengths of the particular rich text media, and the step of converting one particular rich text medium comprises the steps of:

specifying the specific objects according to the specific drawing images stored in the storage medium;

expanding each of the objects other than the specific objects to a drawing image according to one image-drawing operation;

combining the drawing images of the objects of one particular rich text medium into a display image of the particular rich text medium for each particular rich text medium other than the specific rich text medium; and combining the drawing images of the objects of the specific rich text medium into a display image of the specific rich text medium while using the specific drawing images of the specific objects stored in the storage medium.

10. A rich text medium displaying method according to claim 9 in which the step of selecting one or more specific drawing images comprises the steps of:

detecting frequency in use of each drawing image; and setting one or more drawing images of high frequencies as the specific drawing images.

11. A rich text medium displaying method according to claim 1 in which the step of calculating a medium expanding time-length comprises the steps of:

decomposing each particular rich text medium into a plurality of objects;

preparing an image-drawing operation tree of a plurality of image-drawing operations, required to convert the objects of one particular rich text medium into a plurality of drawing images according to the particular output format of the title reproducing terminal, for each particular rich text medium;

expanding each object of one particular rich text medium to a drawing image suitable to the particular output format of the title reproducing terminal according to one image-drawing operation of one image-drawing operation tree corresponding to the particular rich text medium for each particular rich text medium;

estimating an importance degree of each image-drawing operation of a specific image-drawing operation tree according to the arrangement of the image-drawing operations in the specific image-drawing operation tree;

detecting one or more specific image-drawing operations having high importance degrees from the image-drawing operations of the specific image-drawing operation tree;

specifying a specific drawing image obtained by expanding one specific object according to one specific image-drawing operation for each specific image-drawing operation;

storing the specific drawing images of the specific objects in a storage medium;

measuring an object expanding time-length, required to expand one object of one particular rich text medium to a drawing image, for each object of the particular rich text media other than the specific objects of a specific rich text medium;

setting an object expanding time-length of each specific object to zero; and adding up the object expanding time-lengths of the objects of one particular rich text medium for each particular rich text medium to obtain the medium expanding time-lengths of the particular rich text media, and the step of converting one particular rich text medium comprises the steps of:

specifying the specific objects according to the specific drawing images stored in the storage medium;

expanding each of the objects other than the specific objects to a drawing image according to one image-drawing operation;

combining the drawing images of the objects of one particular rich text medium into a display image of the particular rich text medium for each particular rich text medium other than the specific rich text medium; and combining the drawing images of the objects of the specific rich text medium into a display image of the specific rich text medium while using the specific drawing images of the specific objects stored in the storage medium.

12. A rich text medium displaying method according to claim 11 in which the step of estimating an importance degree comprises the steps of:

setting each image-drawing operation of the specific image-drawing operation tree as a remarked image-drawing operation;

counting the number of image-drawing operations depending on one remarked image-drawing operation in the specific image-drawing operation tree for each remarked image-drawing operation; and setting an importance degree of each remarked image-drawing operation according to the number of image-drawing operations depending on the remarked image-drawing operation to heighten the importance degree in cases where the number of image-drawing operations depending on the remarked image-drawing operation is high.

13. A rich text medium displaying method according to claim 1 in which the step of calculating a medium expanding time-length comprises the steps of:

detecting that the display times of a plurality of specific rich text media selected from the particular rich text media agree with each other;

decomposing each specific rich text medium into a plurality of objects;

preparing a specific image-drawing operation tree of a plurality of specific image-drawing operations, required to convert the objects of one specific rich text medium into a plurality of drawing images according to the particular output format of the title reproducing terminal, for each specific rich text medium;

preparing a combined image-drawing operation tree by combining the specific image-drawing operation trees while setting each specific image-drawing operation common to two or more specific image-drawing operation trees as one specific image-drawing operation in the combined image-drawing operation tree;

measuring an object expanding time-length of one object required to expand the object to a drawing image according to one specific image-drawing operation for each specific image-drawing operation of the combined image-drawing operation tree; and adding up the object expanding time-lengths of the specific image-drawing operations of the combined image-drawing operation tree to obtain a medium expanding time-length of the specific rich text media, and the step of converting one particular rich text medium comprises the step of:

converting the specific rich text media to a combined display image obtained by expanding objects of the specific rich text media according to the specific image-drawing operations of the combined image-drawing operation tree.

14. A rich text medium displaying method according to claim 1 in which the step of calculating a medium expanding time-length comprises the steps of:

calculating a medium expanding time-length required to expand each particular rich text medium of the particular multimedia title to a display image suitable to one output format for each of a plurality of output formats;

storing the medium expanding time-lengths of the particular rich text media in a storage medium for each of the output formats;

checking whether or not the medium expanding time-lengths of the particular rich text media corresponding to the particular output format of the title reproducing terminal are stored in the storage medium; and calculating a medium expanding time-length required to expand each particular rich text medium of the particular multimedia title to a display image suitable to the particular output format of the title reproducing terminal in cases where any medium expanding time-length corresponding to the particular output format of the title reproducing terminal is not stored in the storage medium.

15. A rich text medium displaying method according to claim 1 in which the step of calculating a medium expanding time-length comprises the steps of:

decomposing each specific rich text medium into a plurality of objects;

preparing an image-drawing operation tree of a plurality of image-drawing operations, required to convert the objects of one particular rich text medium into a plurality of drawing images according to the particular output format of the title reproducing terminal, for each particular rich text medium;

measuring an object expanding time-length of one object required to expand the object to a drawing image according to one image-drawing operation for each object of the particular rich text media;

dividing the image-drawing operations of each image-drawing operation tree into a first group of image-drawing operations corresponding to first objects of one particular rich text medium and a second group of image-drawing operations corresponding to second objects of the particular rich text medium on condition that the first group of image-drawing operations has no dependence relationship with the second group of image-drawing operations;

adding up the object expanding time-lengths of the first group of image-drawing operations of one image-drawing operation tree corresponding to one particular rich text medium to obtain a first medium expanding time-length of the particular rich text medium for each particular rich text medium; and adding up the object expanding time-lengths of the second group of image-drawing operations of one image-drawing operation tree corresponding to one particular rich text medium to obtain a second medium expanding time-length of the particular rich text medium for each particular rich text medium, the step of sending a scenario comprises the step of:

sending the second group of image-drawing operations of the image-drawing operation trees, the second objects of the particular rich text media, the second medium expanding time-lengths of the particular rich text media, the scenario and the first medium expanding time-lengths of the particular rich text media to the title reproducing terminal, the step of sending a medium expanding request comprises the step of:

sending a medium expanding request, which indicates to expand one particular rich text medium to a display image and to send the display image of the particular rich text medium to the title reproducing terminal at the display time of the particular rich text medium, to the server at a first specific time earlier than the display time of each particular rich text medium by the first medium expanding time-length of the particular rich text medium, the step of converting one particular rich text medium comprises the steps of:

expanding the first objects of each particular rich text medium to a plurality of first drawing images suitable to the particular output format of the title reproducing terminal at the first specific time according to the first group of image-drawing operations of one image-drawing operation tree in the server;

converting the first drawing images of each particular rich text medium to a first display image suitable to the particular output format of the title reproducing terminal by combining the first drawing images in the server;

expanding the second objects of each particular rich text medium to a plurality of second drawing images suitable to the particular output format of the title reproducing terminal according to the second group of image-drawing operations of one image-drawing operation tree in the title reproducing terminal at a second specific time earlier than the display time of the particular rich text medium by the second medium expanding time-length of the particular rich text medium; and converting the second drawing images of each particular rich text medium to a second display image suitable to the particular output format of the title reproducing terminal by combining the second drawing images in the title reproducing terminal, and the step of sending the display image comprises the steps of:

sending the first display image of each particular rich text medium from the server to the title reproducing terminal at the display time of the particular rich text medium; and combining the first and second display images of each particular rich text medium to produce a combined display image for each particular rich text medium.

16. A rich text medium displaying method according to claim 15 in which the step of dividing the image-drawing operations comprises the steps of:

calculating a first medium expanding time-length of each particular rich text medium by adding up the object expanding time-lengths of the first group of image-drawing operations of one image-drawing operation tree corresponding to the particular rich text medium;

calculating a second medium expanding time-length of each particular rich text medium by adding up the object expanding time-lengths of the second group of image-drawing operations of one image-drawing operation tree corresponding to the particular rich text medium; and dividing the image-drawing operations of each image-drawing operation tree into the first group of image-drawing operations and the second group of image-drawing operations on condition that the first medium expanding time-length of the particular rich text medium corresponding to the image-drawing operation tree is almost equal to the second medium expanding time-length of the particular rich text medium.

17. A rich text medium displaying method according to claim 1 in which the step of calculating a medium expanding time-length comprises the steps of:

calculating a medium expanding time-length required to expand each particular rich text medium of the particular multimedia title to a display image suitable to one output format for each of a plurality of output formats;

storing the medium expanding time-lengths of the particular rich text media in a first storage medium for each of the output formats;

checking whether or not the medium expanding time-lengths of the particular rich text media corresponding to the particular output format of the title reproducing terminal are stored in the first storage medium;

decomposing each particular rich text medium into a plurality of objects in cases where any medium expanding time-length corresponding to the particular output format of the title reproducing terminal is not stored in the first storage medium;

preparing an image-drawing operation tree of a plurality of image-drawing operations, required to convert the objects of one particular rich text medium into a plurality of drawing images according to the particular output format of the title reproducing terminal, for each particular rich text medium;

expanding each object of one particular rich text medium to a drawing image suitable to the particular output format of the title reproducing terminal according to one image-drawing operation of one image-drawing operation tree corresponding to the particular rich text medium for each particular rich text medium;

storing the drawing images of the objects of the particular rich text media corresponding to the particular output format of the title reproducing terminal in a second storage medium; and setting a medium expanding time-length, required to expand each particular rich text medium of the particular multimedia title to a display image suitable to the particular output format of the title reproducing terminal, to zero, and the step of converting one particular rich text medium comprises the steps of:

reading out the drawing images stored in the second storage medium; and combining the drawing images of the objects of one particular rich text medium into a display image of the particular rich text medium for each particular rich text medium.

18. A rich text medium displaying method according to claim 1 in which the step of calculating a medium expanding time-length comprises the steps of:

calculating a medium expanding time-length required to expand each particular rich text medium of the particular multimedia title to a display image suitable to one output format for each of a plurality of output formats;

storing the medium expanding time-lengths of the particular rich text media in a first storage medium for each of the output formats;

checking whether or not the medium expanding time-lengths of the particular rich text media corresponding to the particular output format of the title reproducing terminal are stored in the first storage medium;

decomposing each particular rich text medium into a plurality of objects in cases where any medium expanding time-length corresponding to the particular output format of the title reproducing terminal is not stored in the first storage medium;

detecting that the display times of a plurality of specific rich text media selected from the particular rich text media agree with each other;

preparing an image-drawing operation tree of a plurality of image-drawing operations, required to convert the objects of one particular rich text medium into a plurality of drawing images according to the particular output format of the title reproducing terminal, for each of the particular rich text media other than the specific rich text media;

expanding each object of one particular rich text medium to a drawing image suitable to the particular output format of the title reproducing terminal according to one image-drawing operation of one image-drawing operation tree corresponding to the particular rich text medium for each of the particular rich text media other than the specific rich text media;

preparing a specific image-drawing operation tree of a plurality of specific image-drawing operations, required to convert the objects of one specific rich text medium into a plurality of drawing images according to the particular output format of the title reproducing terminal, for each specific rich text medium;

preparing a combined image-drawing operation tree of a plurality of specific image-drawing operations by combining the specific image-drawing operation trees while setting each specific image-drawing operation common to two or more specific image-drawing operation trees as one specific image-drawing operation in the combined image-drawing operation tree, the combined image-drawing operation tree corresponding to a plurality of objects of a combined rich text medium obtained by combining the specific rich text media;

expanding each object of the combined rich text medium to a drawing image suitable to the particular output format of the title reproducing terminal according to one specific image-drawing operation of the combined image-drawing operation tree;

storing the drawing images of the objects of the particular rich text media other than the specific rich text media and the drawing images of the objects of the combined rich text medium in a second storage medium;

setting a medium expanding time-length, required to expand each of the particular rich text media other than the specific rich text media to a display image suitable to the particular output format of the title reproducing terminal, to zero; and setting a medium expanding time-length, required to expand the combined rich text medium to a display image suitable to the particular output format of the title reproducing terminal, to zero, and the step of converting one particular rich text medium comprises the step of:

reading out the drawing images stored in the second storage medium;

combining the drawing images of the objects of one particular rich text medium into a display image of the particular rich text medium for each of the particular rich text media other than the specific rich text media; and combining the drawing images of the objects of the combined rich text medium into a display image of the combined rich text medium.

19. A picture information providing system, comprising:

a server for providing a particular multimedia title as picture information; and a title reproducing terminal for reproducing the particular multimedia title provided from the server, the server comprising:

picture information storing means for storing a plurality of particular rich text media of the particular multimedia title and a scenario specifying a display time of each particular rich text medium;

medium expanding means for expanding each particular rich text medium stored in the picture information storing means to a display image suitable to an output format and calculating a medium expanding time-length, required to expand one particular rich text medium to one display image suitable to one output format, for each particular rich text medium;

expanding time-length storing means for storing the medium expanding time-lengths of the particular rich text media calculated by the medium expanding means for each of a plurality of output formats; and server control means for controlling the medium expanding means to calculate a medium expanding time-length of one particular rich text medium corresponding to a particular output format for each particular rich text medium in advance or in response to an expanding time-length request sent from the title reproducing terminal, sending the scenario stored in the picture information storing means and the medium expanding time-lengths of the particular rich text media corresponding to the particular output format to the title reproducing terminal in response to the expanding time-length request, controlling the medium expanding means to convert one particular rich text medium to a display image suitable to the particular output format each time a medium expanding request sent from the title reproducing terminal is received, and sending the display image of one particular rich text medium to the title reproducing terminal at the display time of the particular rich text medium in response to each medium expanding request, and the title reproducing terminal comprising:

scheduling means for recognizing the display time of each particular rich text medium according to the scenario sent from the server and specifying a specific time earlier than the display time of one particular rich text medium by the medium expanding time-length of the particular rich text medium sent from the server for each particular rich text medium;

title control means for sending the expanding time-length request to the server, receiving the scenario and the medium expanding time-lengths of the particular rich text media corresponding to the particular output format from the server, sending one medium expanding request, which indicates to expand one particular rich text medium to a display image and to send the display image of the particular rich text medium to the title reproducing terminal at the display time of the particular rich text medium, to the server at the specific time of the particular rich text medium specified by the scheduling means for each particular rich text medium, and receiving the display image of each particular rich text medium at the display time of the particular rich text medium from the server; and medium displaying means for displaying the display image of one particular rich text medium received by the title control means at the display time of the particular rich text medium for each particular rich text medium to reproduce the particular multimedia title.

20. A picture information providing system according to the claim 19 in which the medium expanding means of the server performs the calculation of the medium expanding time-length of each particular rich text medium by decomposing each particular rich text medium into a plurality of objects;

dividing a plurality of operations required to convert the objects of each particular rich text medium into operations not depending on the particular output format and image-drawing operations depending on the particular output format;

preparing an image-drawing operation tree of the image-drawing operations according to the particular output format for each particular rich text medium;

expanding each object of one particular rich text medium to a drawing image according to one image-drawing operation of one image-drawing operation tree for each particular rich text medium;

measuring an object expanding time-length, required to expand one object of one particular rich text medium to the drawing image, for each object of the particular rich text media; and adding up the object expanding time-lengths of the objects of one particular rich text medium for each particular rich text medium to obtain the medium expanding time-lengths of the particular rich text media.

21. A picture information providing system according to the claim 19 in which the medium expanding time-length of each particular rich text medium stored in the expanding time-length storing means of the server is composed of a plurality of object expanding time-lengths respectively required to expand an object of the particular rich text medium to a drawing image according to one output format, the server control means of the server selects a plurality of particular object expanding time-lengths of the objects of the particular rich text media corresponding to the particular output format from the object expanding time-lengths stored in the expanding time-length storing means, and the medium expanding means of the server adds up the particular object expanding time-lengths of the objects of each particular rich text medium to obtain the medium expanding time-lengths of the particular rich text media.

22. A picture information providing system according to the claim 19 in which the medium expanding time-length of each particular rich text medium stored in the expanding time-length storing means of the server is composed of a plurality of object expanding time-lengths respectively required to expand an object of the particular rich text medium to a drawing image according to one output format, the server control means of the server checks whether or not a plurality of particular object expanding time-lengths of the objects of each particular rich text medium corresponding to the particular output format are stored in the expanding time-length storing means and measures a particular object expanding time-length of each object of one particular rich text medium corresponding to the particular output format in cases where the particular object expanding time-lengths of the objects of the particular rich text medium corresponding to the particular output format are not stored in the expanding time-length storing means, the expanding time-length storing means stores the particular object expanding time-lengths of the objects of the particular rich text medium corresponding to the particular output format, and the medium expanding means of the server adds up the particular object expanding time-lengths of the objects of the particular rich text medium to obtain the medium expanding time-length of the particular rich text medium.

23. A picture information providing system according to the claim 19 in which the server control means of the server checks whether or not it is possible to decompose each particular rich text medium into a plurality of objects, the medium expanding means of the server directly expands one particular rich text medium to a display image in cases where it is impossible to decompose the particular rich text medium into a plurality of objects and measures a medium expanding time-length required to directly expand the particular rich text medium to the display image.

24. A picture information providing system according to the claim 19 in which the server control means of the server checks whether or not it is possible to decompose each particular rich text medium into a plurality of objects, the expanding time-length storing means of the server stores a medium expanding time-length, required to expand one particular rich text medium to a display image according to each of a plurality of output formats in cases where it is impossible to decompose the particular rich text medium into a plurality of objects, and the server control means of the server selects a particular medium expanding time-length corresponding to the particular output format stored in the expanding time-length storing means.

25. A picture information providing system according to the claim 19 in which the server control means of the server checks whether or not it is possible to decompose each particular rich text medium into a plurality of objects, the expanding time-length storing means of the server stores a medium expanding time-length, required to expand one particular rich text medium to a display image according to each of a plurality of output formats, in cases where it is impossible to decompose the particular rich text medium into a plurality of objects, the server control means of the server checks whether or not a particular medium expanding time-length of the particular rich text medium corresponding to the particular output format is stored in the expanding time-length storing means, the medium expanding means of the server directly expands the particular rich text medium to a display image in cases where a particular medium expanding time-length of the particular rich text medium corresponding to the particular output format is not stored in the expanding time-length storing means and measures a particular medium expanding time-length required to directly expand the particular rich text medium to the display image, and the expanding time-length storing means stores the particular medium expanding time-length of the particular rich text medium corresponding to the particular output format.

26. A picture information providing system according to the claim 19, further comprising:

drawing image storing means, arranged in the server, for storing one or more specific drawing images of specific objects of a specific rich text medium selected from a plurality of drawing images of the particular rich text media by the server control means, the drawing images being obtained by decomposing each particular rich text medium into a plurality of objects and expanding each object of the particular rich text media to a drawing image suitable to the particular output format in the medium expanding means, wherein the medium expanding means of the server measures an object expanding time-length, required to expand one object of one particular rich text medium to a drawing image, for each object of the particular rich text media other than the specific objects of the specific rich text medium, sets an object expanding time-length of each specific object to zero and adds up the object expanding time-lengths of the objects of each particular rich text medium to obtain the medium expanding time-lengths of the particular rich text media, in response to the expanding time-length request, the medium expanding means of the server expands each of the objects other than the specific objects to a drawing image according to one image-drawing operation, combines the drawing images of the objects of one particular rich text medium into a display image of the particular rich text medium for each particular rich text medium other than the specific rich text medium and combines the drawing images of the objects of the specific rich text medium into a display image of the specific rich text medium while using the specific drawing images of the specific objects stored in the drawing image storing means.

27. A picture information providing system according to the claim 26 in which the specific drawing images stored in the drawing image storing means are determined by detecting frequency in use of each drawing image and selecting one or more drawing images of high frequencies as the specific drawing images in the server control means.

28. A picture information providing system according to the claim 19, further comprising:

drawing image storing means, arranged in the server, for storing drawing images, wherein the medium expanding means of the server performs, in response to the expanding time-length request, the steps of decomposing each particular rich text medium into a plurality of objects, preparing an image-drawing operation tree of a plurality of image-drawing operations, required to convert the objects of one particular rich text medium into a plurality of drawing images according to the particular output format, for each particular rich text medium, expanding each object of one particular rich text medium to a drawing image suitable to the particular output format according to one image-drawing operation of one image-drawing operation tree corresponding to the particular rich text medium for each particular rich text medium, estimating an importance degree of each image-drawing operation of a specific image-drawing operation tree according to the arrangement of the image-drawing operations in the specific image-drawing operation tree, detecting one or more specific image-drawing operations having high importance degrees from the image-drawing operations of the specific image-drawing operation tree, specifying a specific drawing image obtained by expanding one specific object according to one specific image-drawing operation for each specific image-drawing operation, measuring an object expanding time-length, required to expand one object of one particular rich text medium to a drawing image, for each object of the particular rich text media other than the specific objects of a specific rich text medium, setting an object expanding time-length of each specific object to zero and adding up the object expanding time-lengths of the objects of one particular rich text medium for each particular rich text medium to obtain the medium expanding time-lengths of the particular rich text media, the drawing image storing means stores the specific drawing images of the specific objects specified by the medium expanding means, and the medium expanding means of the server performs, in response to each medium expanding request, the steps of expanding each of the objects of one particular rich text medium other than the specific objects to a drawing image according to one image-drawing operation, combining the drawing images of the objects of one particular rich text medium other than the specific rich text medium into a display image of the particular rich text medium and combining the drawing images of the objects of the specific rich text medium into a display image of the specific rich text medium while using the specific drawing images of the specific objects stored in the drawing image storing means.

29. A picture information providing system according to the claim 19 in which the medium expanding means performs, in response to the expanding time-length request, the steps of detecting that the display times of a plurality of specific rich text media selected from the particular rich text media agree with each other, decomposing each specific rich text medium into a plurality of objects, preparing a specific image-drawing operation tree of a plurality of specific image-drawing operations, required to convert the objects of one specific rich text medium into a plurality of drawing images according to the particular output format, for each specific rich text medium, preparing a combined image-drawing operation tree by combining the specific image-drawing operation trees while setting each specific image-drawing operation common to two or more specific image-drawing operation trees as one specific image-drawing operation in the combined image-drawing operation tree, measuring an object expanding time-length of one object required to expand the object to a drawing image according to one specific image-drawing operation for each specific image-drawing operation of the combined image-drawing operation tree and adding up the object expanding time-lengths of the specific image-drawing operations of the combined image-drawing operation tree to obtain a medium expanding time-length of the specific rich text media, and the medium expanding means performs, in response to the medium expanding request, the steps of converting the specific rich text media to a combined display image obtained by expanding objects of the specific rich text media according to the specific image-drawing operations of the combined image-drawing operation tree.

30. A picture information providing system according to the claim 19, further comprising:

second medium expanding means, arranged in the title reproducing terminal, for performing an expanding operation, wherein the medium expanding means performs, in response to the expanding time-length request, the steps of decomposing each specific rich text medium into a plurality of objects, preparing an image-drawing operation tree of a plurality of image-drawing operations, required to convert the objects of one particular rich text medium into a plurality of drawing images according to the particular output format, for each particular rich text medium, measuring an object expanding time-length of one object required to expand the object to a drawing image according to one image-drawing operation for each object of the particular rich text media, dividing the image-drawing operations of each image-drawing operation tree into a first group of image-drawing operations corresponding to first objects of one particular rich text medium and a second group of image-drawing operations corresponding to second objects of the particular rich text medium on condition that the first group of image-drawing operations has no dependence relationship with the second group of image-drawing operations, adding up the object expanding time-lengths of the first group of image-drawing operations of one image-drawing operation tree corresponding to one particular rich text medium to obtain a first medium expanding time-length of the particular rich text medium for each particular rich text medium and adding up the object expanding time-lengths of the second group of image-drawing operations of one image-drawing operation tree corresponding to one particular rich text medium to obtain a second medium expanding time-length of the particular rich text medium for each particular rich text medium, the server control means sends the second group of image-drawing operations of the image-drawing operation trees, the second objects of the particular rich text media, the second medium expanding time-lengths of the particular rich text media, the scenario and the first medium expanding time-lengths of the particular rich text media to the title reproducing terminal, the title control means sends the medium expanding request, which indicates to expand one particular rich text medium to a display image and to send the display image of the particular rich text medium to the title reproducing terminal at the display time of the particular rich text medium, to the server at a first specific time earlier than the display time of each particular rich text medium by the first medium expanding time-length of the particular rich text medium, the medium expanding means of the server performs, in response to the medium expanding request, the steps of expanding the first objects of each particular rich text medium to a plurality of first drawing images suitable to the particular output format at the first specific time according to the first group of image-drawing operations of one image-drawing operation tree, converting the first drawing images of each particular rich text medium to a first display image suitable to the particular output format by combining the first drawing images in the server, the second medium expanding means of the title reproducing terminal performs the steps of expanding the second objects of each particular rich text medium to a plurality of second drawing images suitable to the particular output format according to the second group of image-drawing operations of one image-drawing operation tree at a second specific time earlier than the display time of the particular rich text medium by the second medium expanding time-length of the particular rich text medium and converting the second drawing images of each particular rich text medium to a second display image suitable to the particular output format by combining the second drawing images in the title reproducing terminal, the server control means of the server sends the first display image of each particular rich text medium to the title reproducing terminal at the display time of the particular rich text medium, and the title control means of the title reproducing terminal combines the first and second display images of each particular rich text medium to produce a combined display image for each particular rich text medium.

31. A picture information providing system according to the claim 19, further comprising:

drawing image storing means, arranged in the server, for storing drawing images, wherein the medium expanding means calculates a medium expanding time-length required to expand each particular rich text medium of the particular multimedia title to a display image suitable to one output format for each of a plurality of output formats, the expanding time-length storing means stores the medium expanding time-lengths of the particular rich text media for each of the output formats, the medium expanding means performs, in response to the expanding time-length request, the steps of checking whether or not the medium expanding time-lengths of the particular rich text media corresponding to the particular output format are stored in the expanding time-length storing means, decomposing each particular rich text medium into a plurality of objects in cases where any medium expanding time-length corresponding to the particular output format is not stored in the expanding time-length storing means, preparing an image-drawing operation tree of a plurality of image-drawing operations, required to convert the objects of one particular rich text medium into a plurality of drawing images according to the particular output format, for each particular rich text medium, expanding each object of one particular rich text medium to a drawing image suitable to the particular output format according to one image-drawing operation of one image-drawing operation tree corresponding to the particular rich text medium for each particular rich text medium and setting a medium expanding time-length, required to expand each particular rich text medium of the particular multimedia title to a display image suitable to the particular output format, to zero, the drawing image storing means of the server stores the drawing images of the objects of the particular rich text media corresponding to the particular output format, the server control means of the server reads out the drawing images stored in the drawing image storing means in response to the medium expanding request, and the medium displaying means of the title reproducing terminal combines the drawing images of the objects of one particular rich text medium into a display image of the particular rich text medium for each particular rich text medium.

* * * * *